US010509173B2

(12) United States Patent
Seyedi et al.

(10) Patent No.: US 10,509,173 B2
(45) Date of Patent: Dec. 17, 2019

(54) OPTICAL NOTCH FILTER SYSTEM WITH INDEPENDENT CONTROL OF COUPLED DEVICES

(71) Applicant: Hewlett Packard Enterprise Development LP, Houston, TX (US)

(72) Inventors: Mir Ashkan Seyedi, Palo Alto, CA (US); Chin-Hui Chen, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/761,781

(22) PCT Filed: Sep. 22, 2015

(86) PCT No.: PCT/US2015/051502
§ 371 (c)(1),
(2) Date: Mar. 20, 2018

(87) PCT Pub. No.: WO2017/052516
PCT Pub. Date: Mar. 30, 2017

(65) Prior Publication Data
US 2019/0064443 A1 Feb. 28, 2019

(51) Int. Cl.
*G02B 5/28* (2006.01)
*G02B 6/293* (2006.01)
*G02B 5/20* (2006.01)

(52) U.S. Cl.
CPC ........... *G02B 6/29395* (2013.01); *G02B 5/20* (2013.01); *G02B 5/28* (2013.01); *G02B 6/293* (2013.01);
(Continued)

(58) Field of Classification Search
CPC ............ G02B 6/29395; G02B 6/29389; G02B 6/29343; G01K 11/00
(Continued)

(56) References Cited

U.S. PATENT DOCUMENTS 6,668,006 B1 * 12/2003 Margalit ............ G02B 6/12007
372/92
7,539,375 B2 5/2009 Popovic
(Continued)

FOREIGN PATENT DOCUMENTS

CN 203644912 U 6/2014
WO WO-0127692 4/2001

OTHER PUBLICATIONS

B. E. Little, et al ; "Very High-Order Microring Resonator Filters for WDM Applications"; IEEE Photonics Technology Letters; vol. 16, No. 10, Oct. 2004.
(Continued)

*Primary Examiner* — Akm E Ullah
(74) *Attorney, Agent, or Firm* — Sheppard Mullin Richter & Hampton LLP

(57) ABSTRACT

In the examples provided herein, a system has a first racetrack resonant waveguide structure, positioned to enable an input light signal to couple from a first waveguide; and a second racetrack resonant waveguide structure, positioned to enable the input light signal to couple between the first racetrack resonant waveguide structure and the second racetrack resonant waveguide structure, and further positioned to enable an output light signal to couple from the second racetrack resonant waveguide structure to a second waveguide. The system also has a primary heating unit, positioned to heat a primary region including a first portion of the first racetrack resonant waveguide structure and a first portion of the second racetrack resonant waveguide struc-
(Continued)

ture, to change a central frequency and a passband width for the system.

18 Claims, 17 Drawing Sheets

(52) U.S. Cl.
CPC ..... *G02B 6/29343* (2013.01); *G02B 6/29389* (2013.01)

(58) Field of Classification Search
USPC .............................................. 374/130; 385/30
See application file for complete search history.

(56) References Cited

U.S. PATENT DOCUMENTS

| | | | |
|---|---|---|---|
| 8,644,896 | B1 | 2/2014 | Bock et al. |
| 8,655,114 | B2 | 2/2014 | Popovic |
| 2003/0235367 | A1* | 12/2003 | Yamazaki .......... G02B 6/29343 385/39 |
| 2004/0047583 | A1 | 3/2004 | Chiba et al. |
| 2006/0198401 | A1* | 9/2006 | Suzuki ............... G02B 6/12007 372/20 |
| 2008/0175538 | A1* | 7/2008 | Chu .................. G02B 6/12007 385/30 |
| 2010/0053712 | A1 | 3/2010 | Carothers |
| 2010/0209038 | A1* | 8/2010 | Popovic .............. G02B 6/12007 385/1 |
| 2013/0063228 | A1 | 3/2013 | Hampel et al. |
| 2014/0110572 | A1* | 4/2014 | Li .......................... G01J 1/0209 250/227.23 |
| 2014/0321502 | A1* | 10/2014 | Ahmed .................. G01K 11/00 374/130 |
| 2015/0049982 | A1 | 2/2015 | Qi et al. |
| 2015/0098674 | A1 | 4/2015 | Varghese et al. |

OTHER PUBLICATIONS

Brent E. Little; "Filter synthesis for periodically coupled mirroring resonators"; Optics Letters / vol. 25, No. 5 / Mar. 1, 2000.

Fengnian Xia, et al.; "Ultra-compact high order ring resonator filters using submicron silicon photonic wires for onchip optical interconnects"; www.research.ibm.com/photonics.

Shijun Xiao, et al; "A highly compact third-order silicon microring add-drop filter with a very large free spectral range; a flat passband and a low delay dispersion"; Oct. 29, 2007 / vol. 15, No. 22 / Optics Express.

Shijun Xiao, et al; "Multiple-channel silicon micro-resonator based filters for WDM applications"; Jun. 11, 2007 / vol. 15, No. 12 / Optics Express.

Yurii Vlasov, et al; "High-throughput silicon nanophotonic wavelength-insensitive switch for on-chip optical networks"; nature photonics | vol. 2 | Apr. 2008 | www.nature.com/naturephotonics.

* cited by examiner

OPTICAL NOTCH FILTER SYSTEM WITH INDEPENDENT CONTROL OF COUPLED DEVICES

STATEMENT OF GOVERNMENT INTEREST

This invention was made with government support under Contract No. H98230-14-3-0011. The government has certain rights in the invention.

BACKGROUND

In a wavelength-division multiplexing (WDM) optical system, multiple light signals at different wavelengths may be joined and transmitted along a waveguide to increase transmission capacity for the system. However, the multiple light signals may not share the same destination in the system, and some selected light signals at particular wavelengths may be switched to another waveguide with a different destination. Thus, it may be useful to enable a selection of light signals at particular wavelengths for switching.

BRIEF DESCRIPTION OF THE DRAWINGS

The accompanying drawings illustrate various examples of the principles described below. The examples and drawings are illustrative rather than limiting.

FIG. 1B depicts a cross-section in the x-y plane of the system. FIG. 1C depicts the system of FIG. 1B further including an input waveguide and an output waveguide. FIG. 1D depicts a cross-section in the x-z plane of the system in FIG. 1C.

FIGS. 4A-1, 4A-2, and 4A-3 depict an example design element for a primary heating unit, FIGS. 4B-1, 4B-2, and 4B-3 depict an example design element for a primary heating unit, and FIGS. 4C-1, 4C-2, and 4C-3 depict an example design element for adjacent racetrack resonant waveguide structures.

FIG. 5A depicts a cross-section of the system, and FIG. 5B depicts the system in FIG. 5A further including an input waveguide, a first output waveguide, and a second output waveguide.

DETAILED DESCRIPTION

In a WDM system, it may be useful to select signals at different wavelengths propagating in a waveguide by using a tunable optical filter, where the central frequency and passband width of the notch filter may be adjusted. It may also be useful for the tunable optical filter to operate as a notch filter, an optical filter with a narrow passband width, to enable the selection of light signals at particular wavelengths without including other wavelengths outside of the passband width.

Figure 1A:
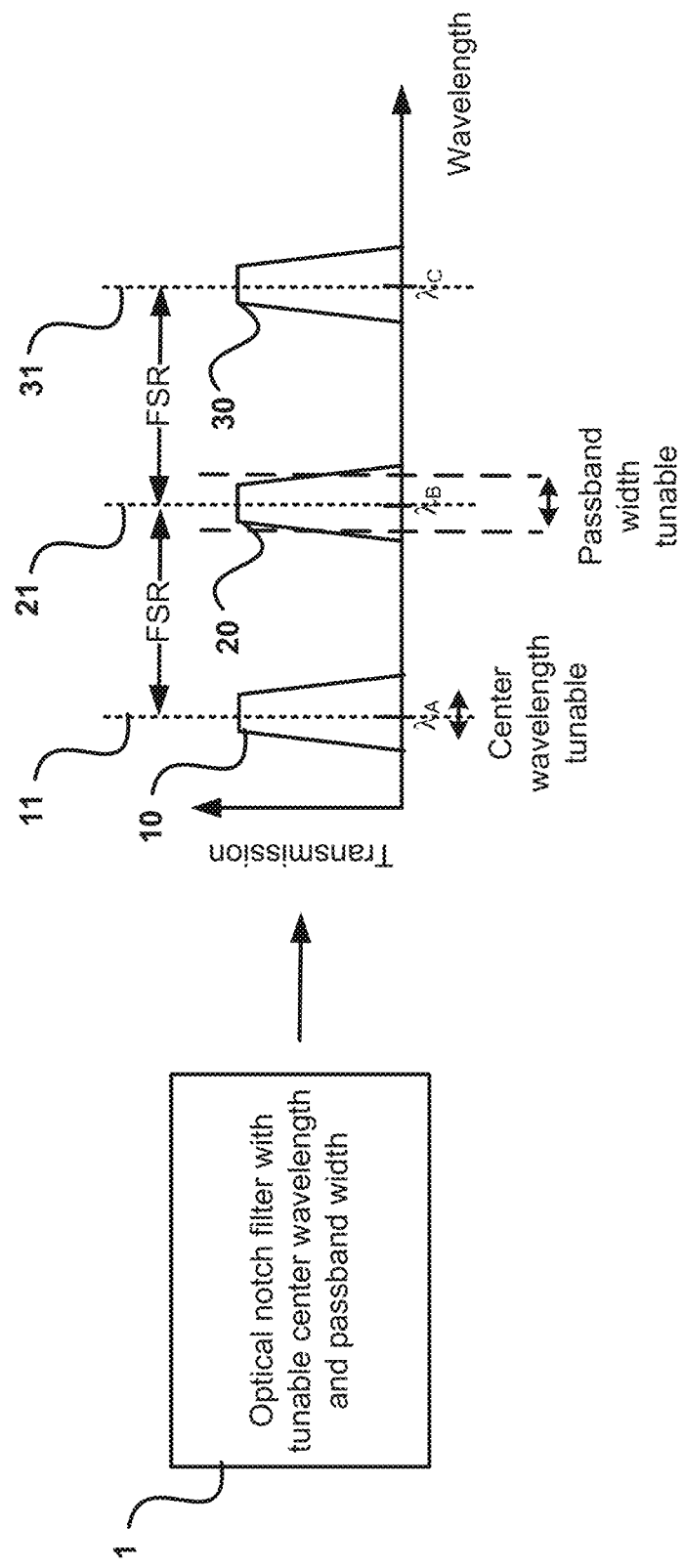
FIG. 1A depicts an example transmission spectrum of an optical notch filter that has a tunable center wavelength and passband width.

The techniques presented herein describe a tunable notch filter that may tune the selection of light signals relative to a central frequency and a passband width, based on optical coupling between adjacent racetrack resonant waveguide structures and using temperature controls to control a coupling parameter and a resonance for adjacent racetrack resonant waveguide structures. FIG. 1A depicts an example transmission spectrum of an optical notch filter 1 that has a tunable center wavelength and passband width. The transmission spectrum has a periodic spectral response where multiple passbands 10, 20, 30 are separated by a free spectral range of the filter. The width of each passband 10, 20, 30 is adjustable, and each passband has a center wavelength 11, 21, 31 that is simultaneously adjustable.

The tunable notch filter 1 may include a system of devices selected from groups of: racetrack resonant waveguide structures, primary heating units, and secondary heating units, wherein each device in a selected group may incorporate particular design elements independent of other devices of the selected group. A design element may be a characteristic that impacts the functional design of the relevant device, including, for example, a characteristic of size, shape, composition, positioning, symmetry, or spacing.

A racetrack resonant waveguide structure may be a waveguide formed in a closed loop. The loop may have a circular shape or a loop with a shape defined by two half circles connected by long straight sections. Light may be evanescently coupled from a second waveguide placed close to the racetrack resonant waveguide structure. At resonant wavelengths of the racetrack resonant waveguide structure, optical power in the second waveguide develops as a standing wave in the resonator. However, light propagating at non-resonant wavelengths in the second waveguide continues to propagate with no coupling effect to the racetrack resonant waveguide structure. Similarly, light may be evanescently coupled out of a racetrack resonant waveguide structure into a different waveguide. The resonant wavelength of the racetrack resonant waveguide structure may be tuned by changing the effective refractive index of the waveguide.

The racetrack resonant waveguide structure may have a passband that is centered on a central frequency, and the central frequency is at the resonance wavelength. Thus, the racetrack resonant waveguide structure may operate as a notch filter, by allowing light signals outside of the passband to continue to propagate unimpeded along the second waveguide, while coupling light signals inside of the passband out of the second waveguide and into the racetrack resonant waveguide structure. The notch filter may be characterized by a signal transfer function.

The resonant wavelength of the racetrack resonant waveguide structure may be tuned by changing an effective refractive index of the racetrack resonant waveguide structure. Changing the temperature of a portion of the racetrack resonant waveguide structure may result in changing the effective refractive index. The temperature change may either be an increase in temperature due to heating or a decrease in temperature due to cooling.

A coupling parameter characterizes the optical coupling between the racetrack resonant waveguide structure and the second waveguide. Changing the temperature of a region between the racetrack resonant waveguide structure and the second waveguide may result in changing the coupling parameter. The central frequency and the passband width for the notch filter may be tuned by changing the resonance of the racetrack resonant waveguide structure and changing the coupling parameter of the optical coupling. Additionally, parameters of the notch filter, such as edge steepness of the passband, may be adjusted by incorporating additional coupled devices in the system, allowing independent tuning for each of multiple resonances and multiple coupling parameters.

Previous solutions for optical filters using optical coupling between racetrack resonator structures did not feature independent controls for coupled devices. The techniques presented herein may allow independent controls for each coupled device, allowing more precision with tuning the parameters of the notch filter system. Additionally, the techniques presented herein may allow for scaling of the notch filter system by incorporating additional devices in series to adjust tuning.

Figure 1B:
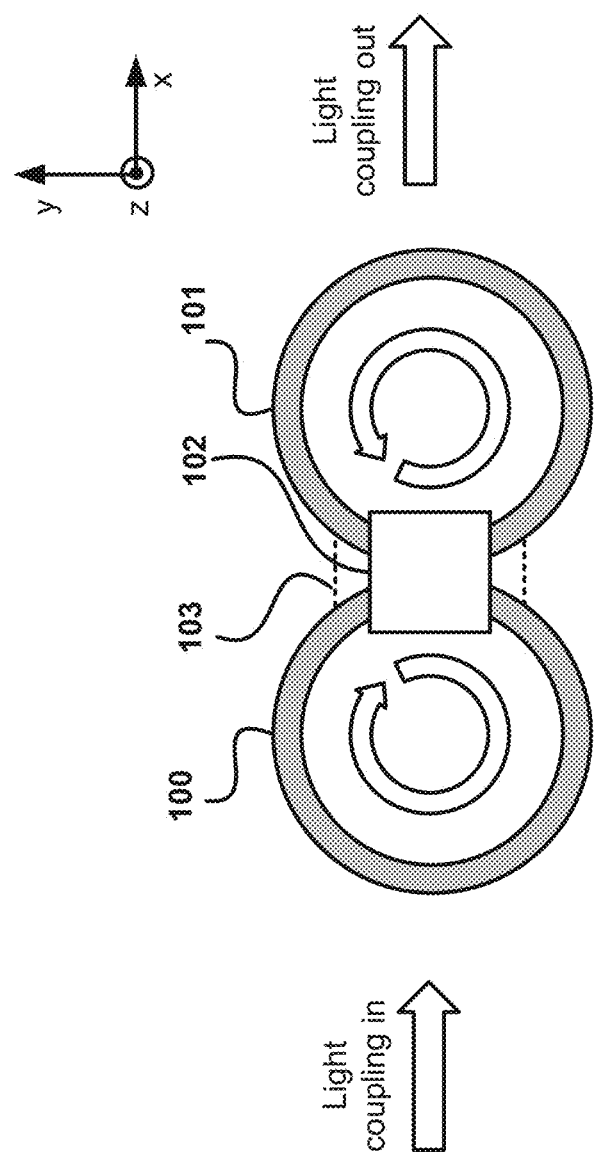
FIGS. 1B, 1C, and 1D depict schematic block diagrams of an example notch filter system including a first racetrack resonant waveguide structure, a second racetrack resonant waveguide structure, and a primary heating unit.
Figure 1C:
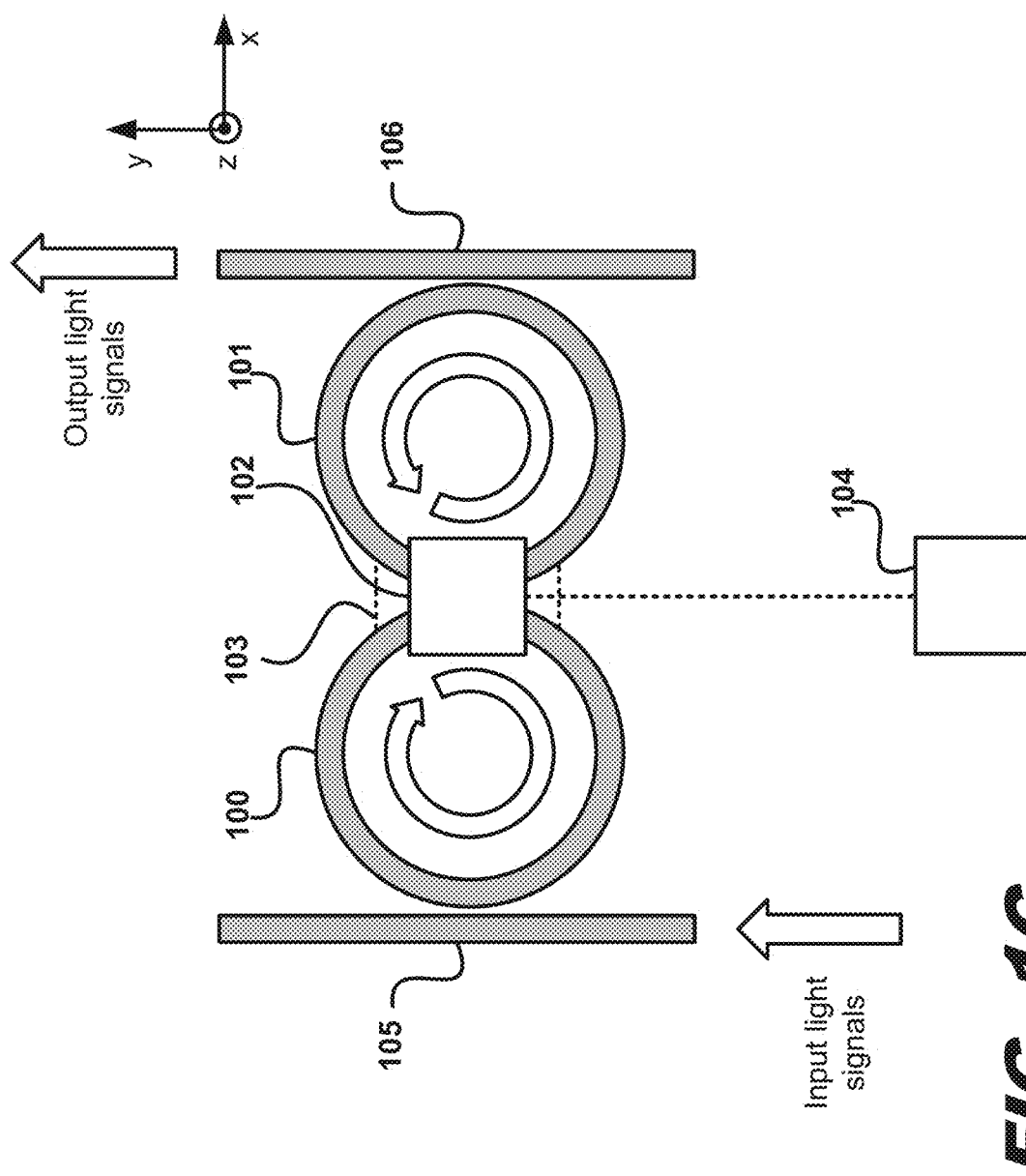
Figures 1D, 1E:
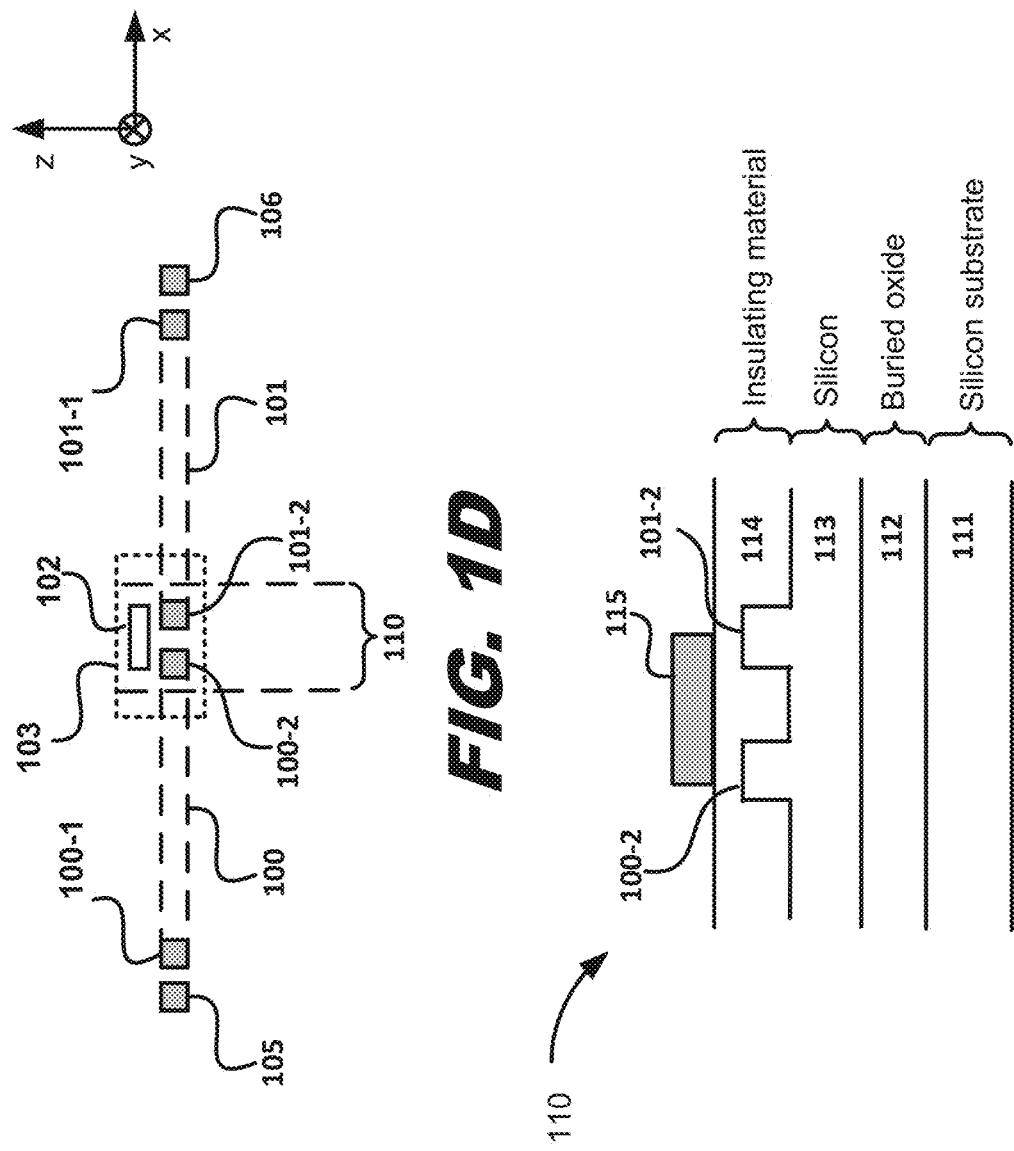
FIG. 1E depicts a block diagram of an example heater relative to two racetrack resonant waveguide structures.

FIGS. 1B, 1C, and 1D depict schematic block diagrams of an example notch filter system, including a first racetrack resonant waveguide structure 100, a second racetrack resonant waveguide structure 101, and a primary temperature changing unit 102. In some implementations, the first racetrack resonant waveguide structure 100 and the second racetrack resonant waveguide structure 101 may be integrated circuit-based waveguides. The temperature changing unit 102 may be a heating unit to heat the region 103, or a cooling unit to cool the region 103. For definiteness, the temperature changing unit 102 will be referred to as a heating unit in the following description, however, it is to be understood that the temperature changing unit 102 may be a cooling unit in some implementations.

FIG. 1B depicts a cross-section of the notch filter system in the x-y plane of the system. The second racetrack resonant waveguide structure 101 may be positioned sufficiently close to the first racetrack resonant waveguide structure 100 to enable an output light signal to couple from the first racetrack resonant waveguide structure 100 to the second racetrack resonant waveguide structure 101. Each of the first racetrack resonant waveguide structure 100 and the second racetrack resonant waveguide structure 101 may vary in a design element, including, for example, size, shape, composition, directionality, and spacing, relative either to each other in an implementation of the system or to other implementations of the system.

FIG. 1C depicts the system in FIG. 1B, further including part of an input waveguide 105 and part of an output waveguide 106. The input waveguide 105 may be positioned sufficiently close to any portion of the first racetrack resonant waveguide structure 100 to enable a portion of an input light signal at the resonant wavelength of the first racetrack resonant waveguide structure 100 to couple from the input waveguide 105 to the first racetrack resonant waveguide structure 100. The output waveguide 106 may be positioned sufficiently close to any portion of the second racetrack resonant waveguide structure 101 to enable the output light signal to couple from the second racetrack resonant waveguide structure 101 to the output waveguide 106. In some implementations, each of the input waveguide 105 and the output waveguide 106 may be an integrated circuit-based waveguide. Each of the input waveguide 105 and the output waveguide 106 may vary in a design element, including, for example, size, shape, composition, directionality, and spacing, relative either to each other in an implementation of the system or to other implementations of the system.

Thus, the input light signal may propagate in the input waveguide 105, and a portion of the input light signal may couple to the first racetrack resonant waveguide structure 100, where the portion coupled depends on the resonant wavelength of the first racetrack resonant waveguide structure 100. An output light signal may couple from the first racetrack resonant waveguide structure 100 to the second racetrack resonant waveguide structure 101, where the portion coupled depends on the resonant wavelength of the second racetrack resonant waveguide structure 101 and the coupling parameter between the first racetrack resonant waveguide structure 100 and the second racetrack resonant waveguide structure 101. The output light signal may then couple from the second racetrack resonant waveguide structure 101 to the output waveguide 106.

For tuning of the notch filter system, the primary heating unit 102 may use heating to change the passband width and the central frequency for the system, thereby selecting the wavelengths comprising the output light signal coupled to the output wavelength 106.

The primary heating unit 102 may use a primary controller 104 to heat a primary region 103 simultaneously, including a first portion of the first racetrack resonant waveguide structure 100 and a first portion of the second racetrack resonant waveguide structure 101. The primary region 103 may vary relative to the primary heating unit 102, including, for example, in size, shape, or continuity, based on a scope of heating by the primary heating unit 102. The primary region 103 may be illustrative of the scope of heating via the primary heating unit 102, rather than limiting. The primary heating unit 102 may vary in a design element, including, for example, size, shape, composition, spacing, and positioning, relative to other implementations of the system.

The primary controller 104 may be used to control the primary heating unit 102. The primary controller 104 may be positioned at a different location from the primary heating unit 102 or the primary region 103. The primary controller 104 may implement a temperature control algorithm to control the primary heating unit 102.

FIG. 1D depicts a cross-section of the notch filter system in the y-z plane of the system shown in FIG. 1C. The primary heating unit 102 may be positioned, for example, in a second plane parallel to a first plane of the first racetrack resonant waveguide structure 100 and the second racetrack resonant waveguide structure 101. The primary region 103 may include an output portion of the first racetrack resonant waveguide structure 100-2 and an input portion of the second racetrack resonant waveguide structure 101-2. The input light signal may couple from the input waveguide 105 to an input portion of the first racetrack resonant waveguide structure 100-1. The output light signal may couple from the output portion of the first racetrack resonant waveguide structure 100-2 to the input portion of the second racetrack resonant waveguide structure 101-2, and further couple from an output portion of the second racetrack resonant waveguide structure 101-1 to the output waveguide 106. In other implementations of the system, the first racetrack resonant waveguide structure 100, the second racetrack resonant waveguide structure 101, the primary heating unit 102, the input waveguide 105, and/or the output waveguide 106 may be positioned elsewhere than in a same plane or in a parallel plane. A close-up of section 110 in FIG. D is shown in FIG. 1E for some implementations.

FIG. 1E depicts a block diagram of an example heater relative to two racetrack resonant waveguide structures. In the example of FIG. 1E, for an integrated circuit implementation, there may be a silicon substrate 111 with a buried oxide layer deposited on top of the silicon substrate 112. On top of the buried oxide layer is a silicon layer 113 where the first 110-2 and second 101-2 resonant waveguide structures are formed. An electrically insulating material layer 114 caps the silicon layer 113. A heater 115 is placed on top of the insulation matter 114 to achieve localized heating of the first 110-2 and second 101-2 resonant waveguide structures. In some implementations, the heater 115 may be positioned symmetrically with respect to the first 110-2 and second 101-2 resonant waveguide structures. With a symmetrically placed heater, the resonances of the first 110-2 and second 101-2 resonant waveguide structures change together such that the free spectral range of the transmission spectrum of each resonant waveguide structure stays the same and lines up. In some implementations, the heater 115 may be positioned asymmetrically with respect to the first 110-2 and second 101-2 resonant waveguide structures.

Alternatively, a resistor may be added to the silicon layer 113 to cause local Joule heating in the silicon to change the resonances of the first 110-2 and second 101-2 resonant waveguide structures.

Figure 2:
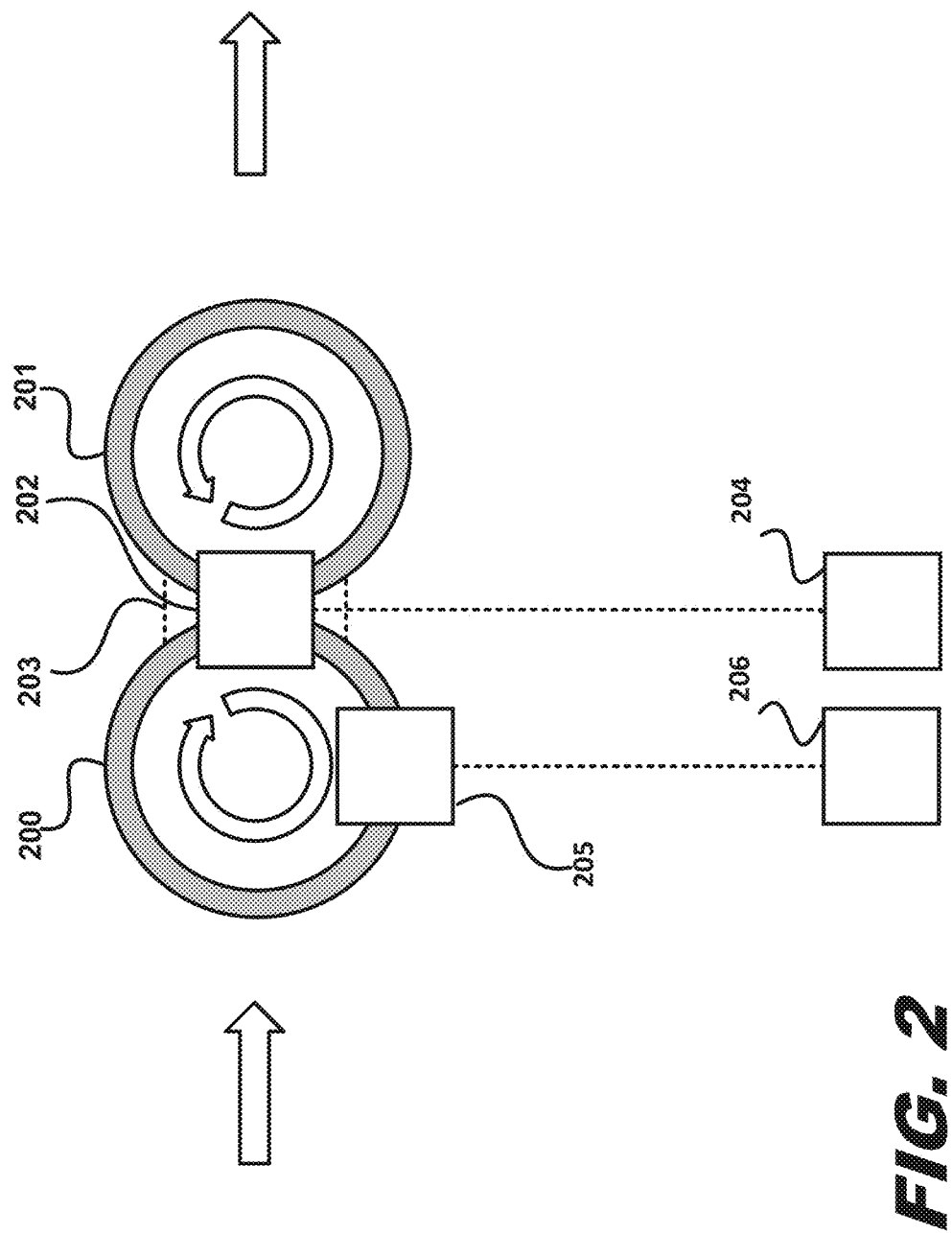
FIG. 2 depicts a schematic block diagram of an example notch filter system that includes a secondary heating unit.

FIG. 2 depicts a schematic block diagram of an example notch filter system that includes a secondary heating unit 205. The secondary heating unit 205 may use a secondary controller 206 to heat a secondary region distinct from the primary region 203 and including a second portion of one of the first racetrack resonant waveguide structure 200 and the second racetrack resonant waveguide structure 201. For example, in FIG. 2 the secondary heating unit 205 is positioned to heat a secondary region including a second portion of racetrack resonant waveguide structure 200. The secondary heating unit 205 may vary in a design element, including, for example, size, shape, composition, spacing, and positioning, relative either to the primary heating unit 202 or to other implementations of the system.

The secondary controller 206 may be independent of the primary controller 204. The secondary controller 206 may be positioned at a different location from the secondary heating unit 205 or the secondary region. The secondary controller 206 may implement a temperature control algorithm to control the secondary heating unit 205. The temperature control algorithm implemented by the secondary controller 206 may be different from that implemented by the primary controller 104. By using a separate secondary heater that affects the temperature of one of the coupled resonant waveguide structures, there may be greater control over the center frequency and passband of the notch filter system.

Figure 3A:
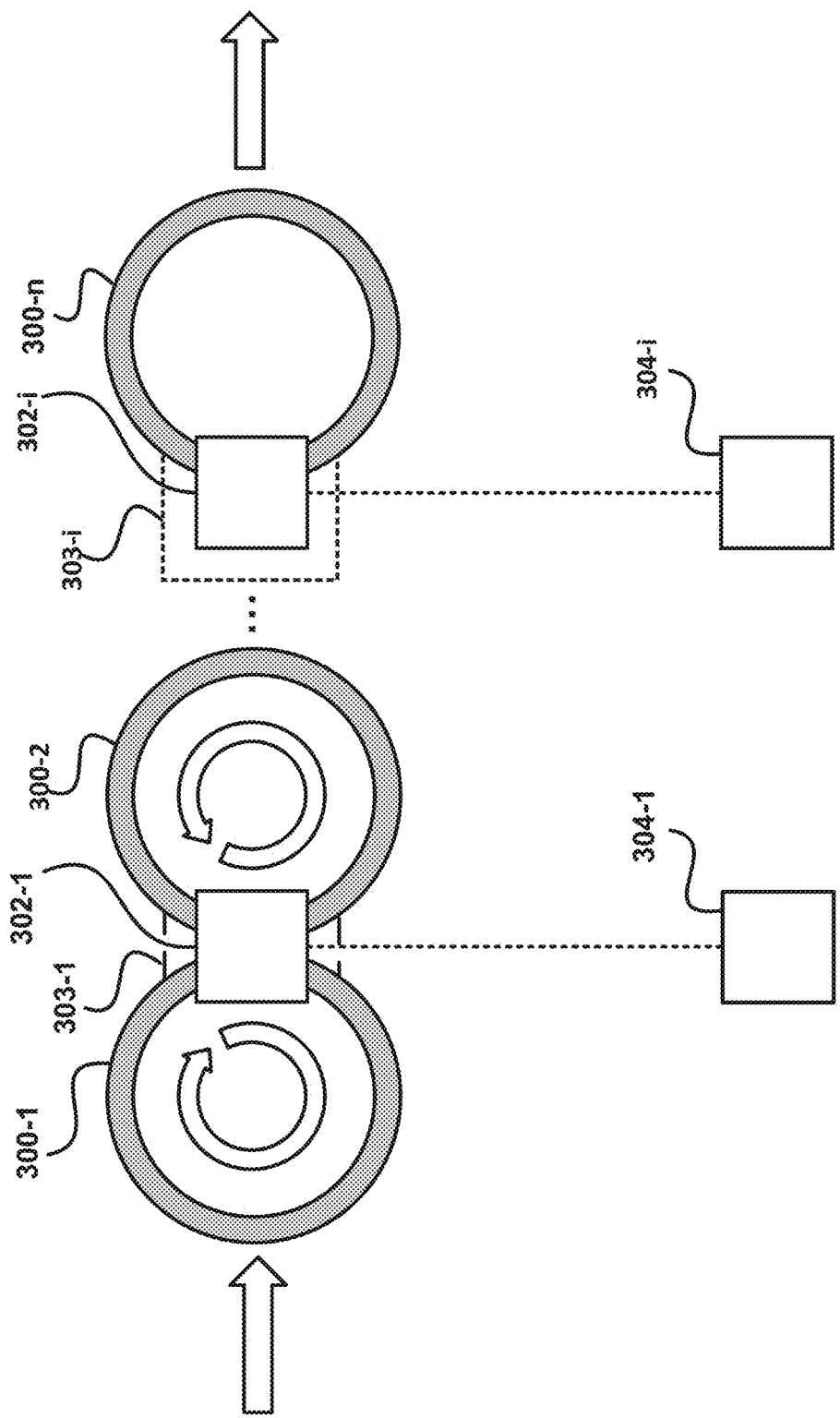
FIGS. 3A and 3B depict schematic block diagrams of the example notch filter system of FIG. 1A that includes an additional racetrack resonant waveguide structure and an additional primary heating unit.
Figure 3B:
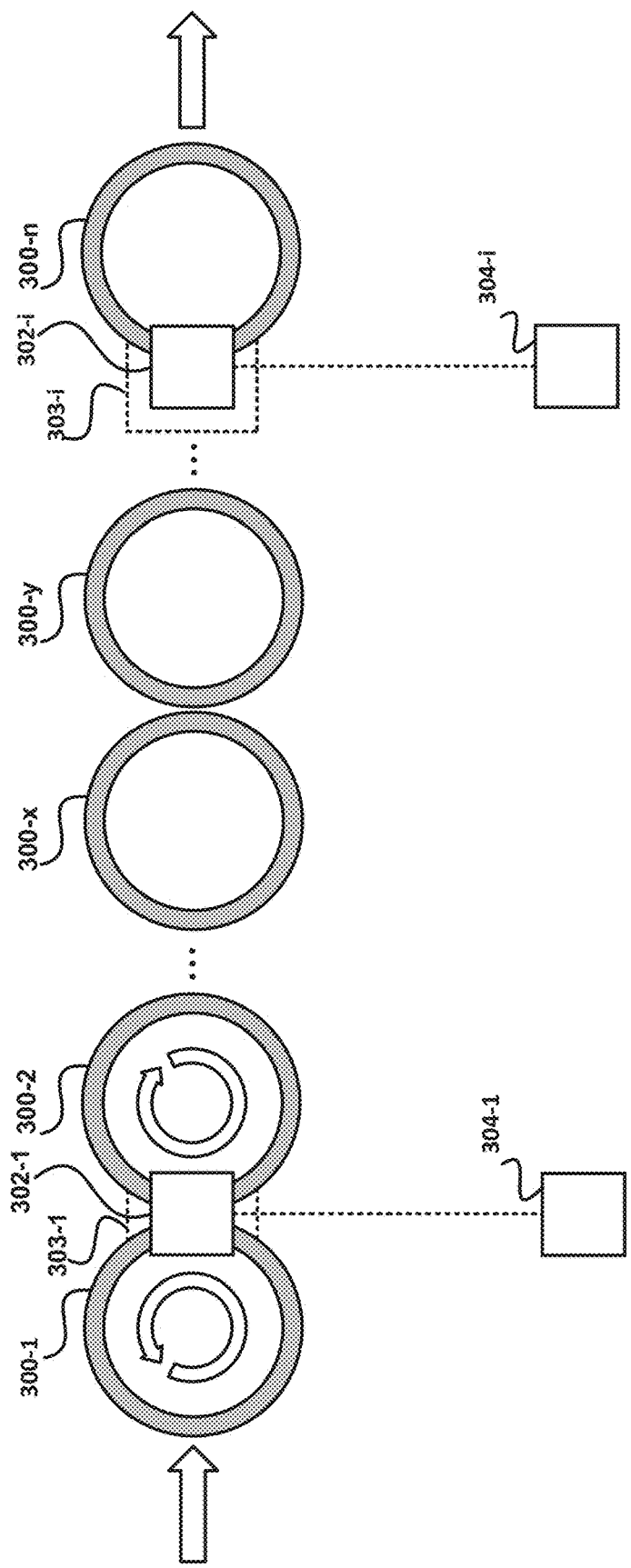

The larger the number of resonant waveguide structures that are coupled in a cascaded manner, the steeper the slopes of the passband (system transfer function). With steeper passband slopes, wavelength channels may be spaced more closely together. FIGS. 3A and 3B depict schematic block diagrams of the example notch filter system of FIG. 1B that includes additional coupled racetrack resonant waveguide structures and additional primary heating units. Each additional racetrack resonant waveguide structure should be positioned sufficiently close to an adjacent racetrack resonant waveguide structure to enable the output light signal to couple between each pair of adjacent racetrack resonant waveguide structures such that the output light signal couples through each racetrack resonant waveguide structure. Each additional primary heating unit may be positioned to heat a corresponding primary region simultaneously, including portions of a corresponding pair of adjacent racetrack resonant waveguide structures. In general, the system may comprise a number n of racetrack resonant waveguide structures and a number i of primary heating units, where n and i may be independent.

FIG. 3A depicts the system in an example case in which a first primary heating unit 302-1 is positioned to heat a corresponding primary region 303-1 simultaneously, including portions of a corresponding pair of adjacent racetrack resonant waveguide structures 300-1, 300-2 that includes a first racetrack resonant waveguide structure 300-1 and a second racetrack resonant waveguide structure 300-2. Further, a last primary heating unit 302-$i$ is positioned to heat a corresponding primary region 303-$i$ simultaneously, including portions of a corresponding pair of adjacent racetrack resonant waveguide structures that includes a last racetrack resonant waveguide structure 300-$n$ and a second-to-last racetrack resonant waveguide structure (not shown). Yet, for example, if the system were to comprise a number n=3 of racetrack resonant waveguide structures, then the second-to-last racetrack resonant waveguide structure may correspond to racetrack resonant waveguide structure 300-2, and the system may comprise a number i=2 of primary heating units. Such a system may depict the example notch filter system of FIG. 1B for an example case of one additional racetrack resonant waveguide structure and one additional primary heating unit, such that the last primary heating unit 302-$i$ may be labeled 302-2 (for number 2) and the last racetrack resonant waveguide structure 300-$n$ may be labeled 302-3 (for number 3). In a general example case, the system may comprise a number i=n−1 of primary heating units, such that each pair of adjacent racetrack resonant waveguide structures has a corresponding primary heating unit positioned to heat a corresponding primary region simultaneously.

However, each pair of adjacent racetrack resonant waveguide structures in the system need not have a corresponding primary heating unit. FIG. 3B depicts the system of FIG. 3A in an example case that includes a pair of adjacent racetrack resonant waveguide structures 300-$x$, 300-$y$ that does not have a corresponding primary heating unit. Yet, for example, if the system were to comprise a number n=4 of racetrack resonant waveguide structures, then racetrack resonant waveguide structure 300-$x$ may correspond to the second racetrack resonant waveguide structure 300-2 and racetrack resonant waveguide structure 300-$y$ may correspond to a second-to-last racetrack resonant waveguide structure, which might be labeled 302-3 (for number 3), such that the system may comprise a number i=2 of primary heating units. Such a system may depict the example notch filter system of FIG. 1B for an example case of two additional racetrack resonant waveguide structures and one additional primary heating unit, such that the last primary heating unit 302-$i$ might be labeled 302-2 (for number 2) and the last racetrack resonant waveguide structure 300-$n$ might be labeled 302-4 (for number 4). In general, the system of FIG. 3B may comprise a number n of racetrack resonant waveguide structures and a number i<n−1 of primary heating units, such that at least one pair of adjacent racetrack resonant waveguide structures 300-x, 300-y does not have a corresponding primary heating unit positioned to heat a corresponding primary region.

The systems depicted in FIG. 3A and FIG. 3B may vary in the number n of racetrack resonant waveguide structures, in the number i of primary heating units, or in a design element, including, for example, size, shape, composition, spacing, and positioning of a racetrack resonant waveguide structure or a primary heating unit, relative to other implementations of the system. Each primary region may vary relative to a corresponding primary heating unit, including, for example, in size, shape, or continuity, based on a scope of heating by the corresponding primary heating unit.

Each primary heating unit may use a corresponding primary controller to heat a corresponding primary region simultaneously, including portions of a corresponding pair of adjacent racetrack resonant waveguide structures. For example, in the systems depicted in FIG. 3A and FIG. 3B, a first primary heating unit 302-1 uses a corresponding primary controller 304-1, whereas a last primary heating unit 302-i uses a corresponding primary controller 304-i. Each primary controller may be independent of each other primary controller. Each primary controller may vary in a design element, including, for example, size, shape, composition, and connection to the corresponding primary heating unit, relative either to other primary controllers in an implementation of the system or to other implementations of the system. Each primary heating unit may use heating to change the central frequency and the passband width for the notch filter system.

FIGS. 4A-1 through 4C-3 depict schematic block diagrams of an example design element in an example notch filter system. A device selected from one of the group of racetrack resonant waveguide structures, primary heating units, and secondary heating units may incorporate a design element different from other devices in the selected group. The example design elements depicted are intended to be illustrative rather than limiting. An implementation of the system may incorporate any number of different design elements.

Figures 1, 4A:
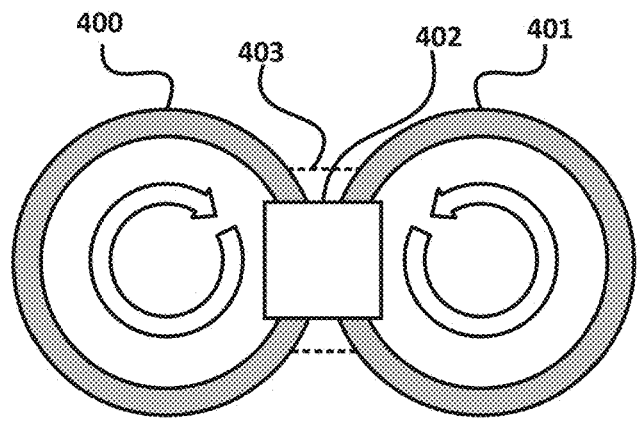
FIGS. 4A-1 through 4C-3 depict schematic block diagrams of an example design element in an example notch filter system.
Figures 2, 4A:
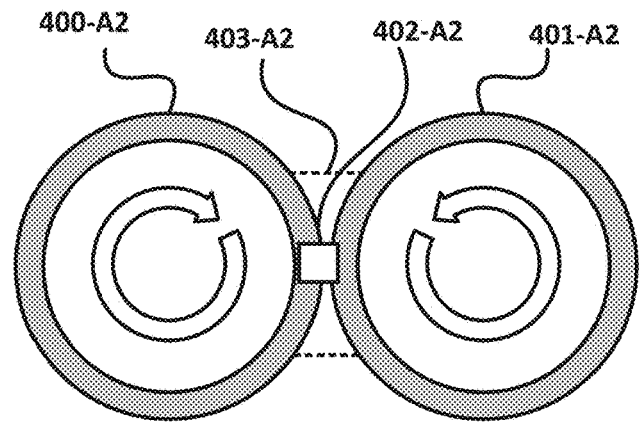
Figures 3, 4A:
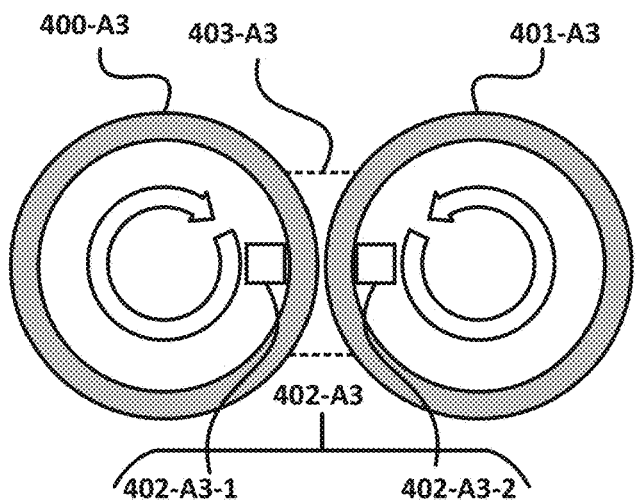

FIGS. 4A-1, 4A-2, and 4A-3 depict an example design element for a primary heating unit. FIG. 4A-1 depicts an example of a primary heating unit 402, heating a primary region 403 including portions of adjacent racetrack resonant waveguide structures 400, 401, with a spacing design element of full overlap with both portions of adjacent racetrack resonant waveguide structures 400, 401 and a positioning design element of symmetry relative to adjacent racetrack resonant waveguide structures. FIG. 4A-2 depicts an example of a primary heating unit 402-A2, positioned to heat a primary region 403-A2 including portions of adjacent racetrack resonant waveguide structures 400-A2, 401-A2, with a spacing design element of partial overlap for both portions of adjacent racetrack resonant waveguide structures 400-A2, 401-A2 and a positioning design element of non-symmetry relative to adjacent racetrack resonant waveguide structures 400-A2, 401-A2. FIG. 4A-3 depicts an example of a primary heating unit 402-A3, including two portions 402-A3-1 and 402-A3-2, heating a primary region 403-A3 including portions of adjacent racetrack resonant waveguide structures 400-A3, 401-A3, with a spacing design element of no overlap with either portion of adjacent resonant structure 400-A3, 401-A3 and a positioning design element of symmetry relative to adjacent racetrack resonant waveguide structures 400-A3, 401-A3. In such a case, the portions of adjacent racetrack resonant waveguide structures 400-A3, 401-A3 may be heated through conduction.

Figures 1, 4B:
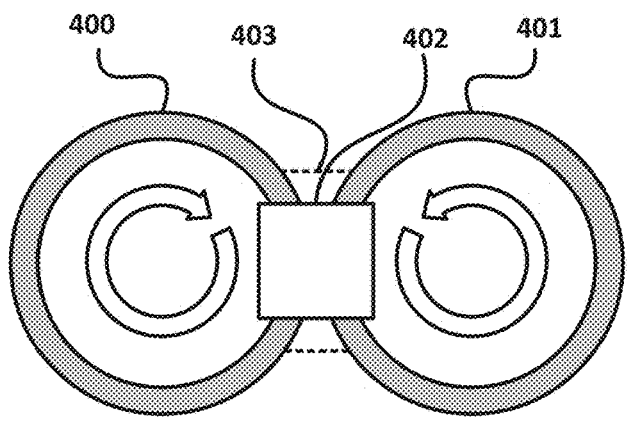
Figures 2, 4B:
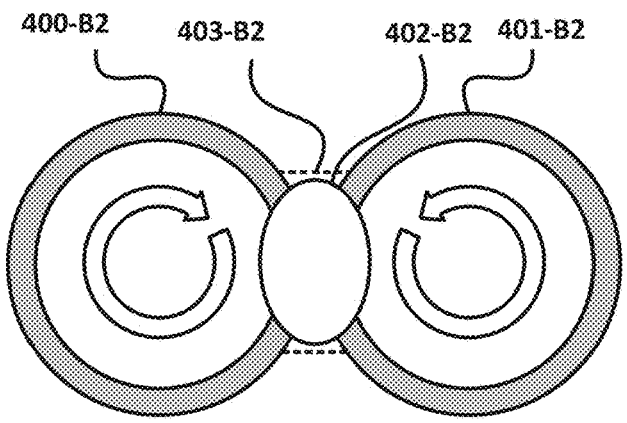
Figures 3, 4B:
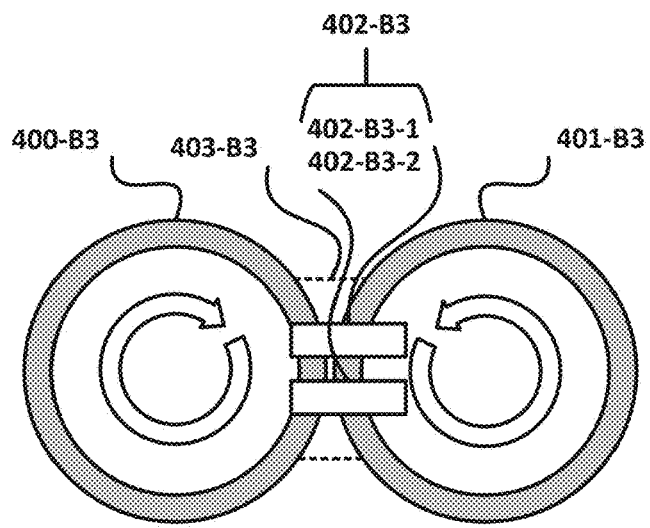

FIGS. 4B-1, 4B-2, and 4B-3 depict an example design element for a primary heating unit. FIG. 4B-1 depicts an example of a primary heating unit 402, positioned to heat a primary region 403 including portions of adjacent racetrack resonant waveguide structures 400, 401, with a shape design element of square. FIG. 4B-2 depicts an example of a primary heating unit 402-B2, heating a primary region 403-B2 including portions of adjacent racetrack resonant waveguide structures 400-B2, 401-B2, with a shape design element of ellipse. FIG. 4B-3 depicts an example of a primary heating unit 402-B3, including two portions 402-B3-1, 402-B3-2, positioned to heat a primary region 403-B3 including portions of adjacent racetrack resonant waveguide structures 400-B3, 401-B3, with a first-portion shape design element of rectangle and a second-portion shape design element of rectangle. The two portions 402-B3-1, 402-B3-2 of the primary heating unit 402-B3 also incorporate a positioning design element of non-symmetry relative to adjacent racetrack resonant waveguide structures 400-B3, 401-B3, such as was depicted in FIG. 4A-2.

Figures 1, 4C:
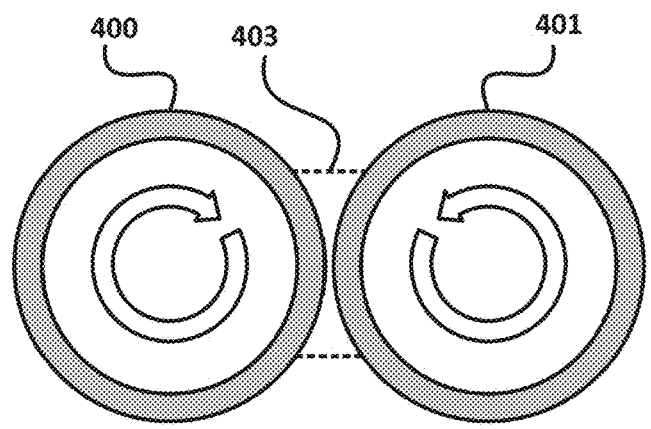
Figures 2, 4C:
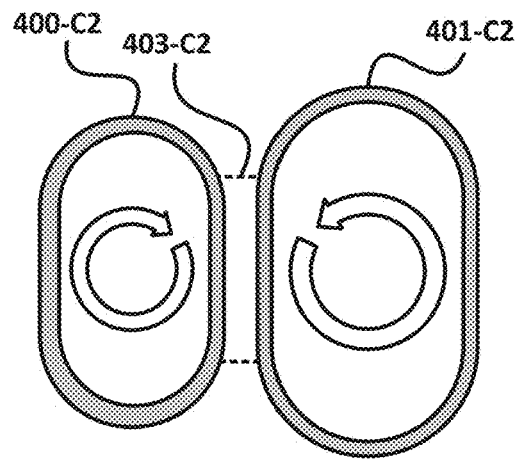
Figures 3, 4C:
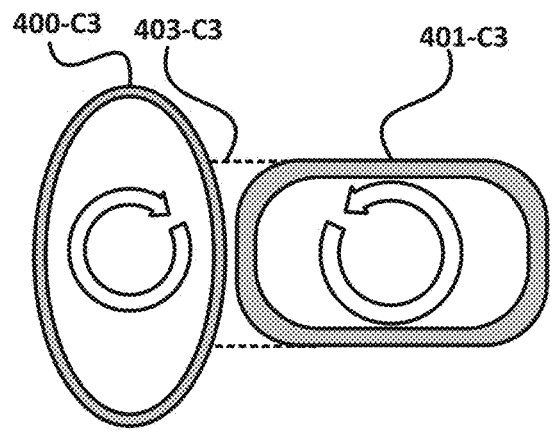

FIGS. 4C-1, 4C-2, 4C-3 depict an example design element for adjacent racetrack resonant waveguide structures. FIG. 4C-1 depicts an example of adjacent racetrack resonant waveguide structures 400, 401 with a shape design element of circle and a positioning design element of symmetry. FIG. 4C-2 depicts an example of adjacent racetrack resonant waveguide structures 400-C2, 401-C2, with a shape design element of rounded rectangle and a positioning design element of non-symmetry, where a first racetrack resonant waveguide structure 400-C2 may be smaller in scale than a second racetrack resonant waveguide structure 401-C2. FIG. 4C-3 depicts an example of adjacent racetrack resonant waveguide structures 400-C3, 401-C3, with a shape design element of ellipse for a first racetrack resonant waveguide structure and a shape design element of rounded rectangle for a second racetrack resonant waveguide structure and a positioning design element of non-symmetry, where a major axis of a first racetrack resonant waveguide structure may be oriented in a different direction than a major axis of a second racetrack resonant waveguide structure. Each of the primary regions 403, 403-C2, and 403-C3 respectively may include corresponding portions of adjacent racetrack resonant waveguide structures.

Figure 5A:
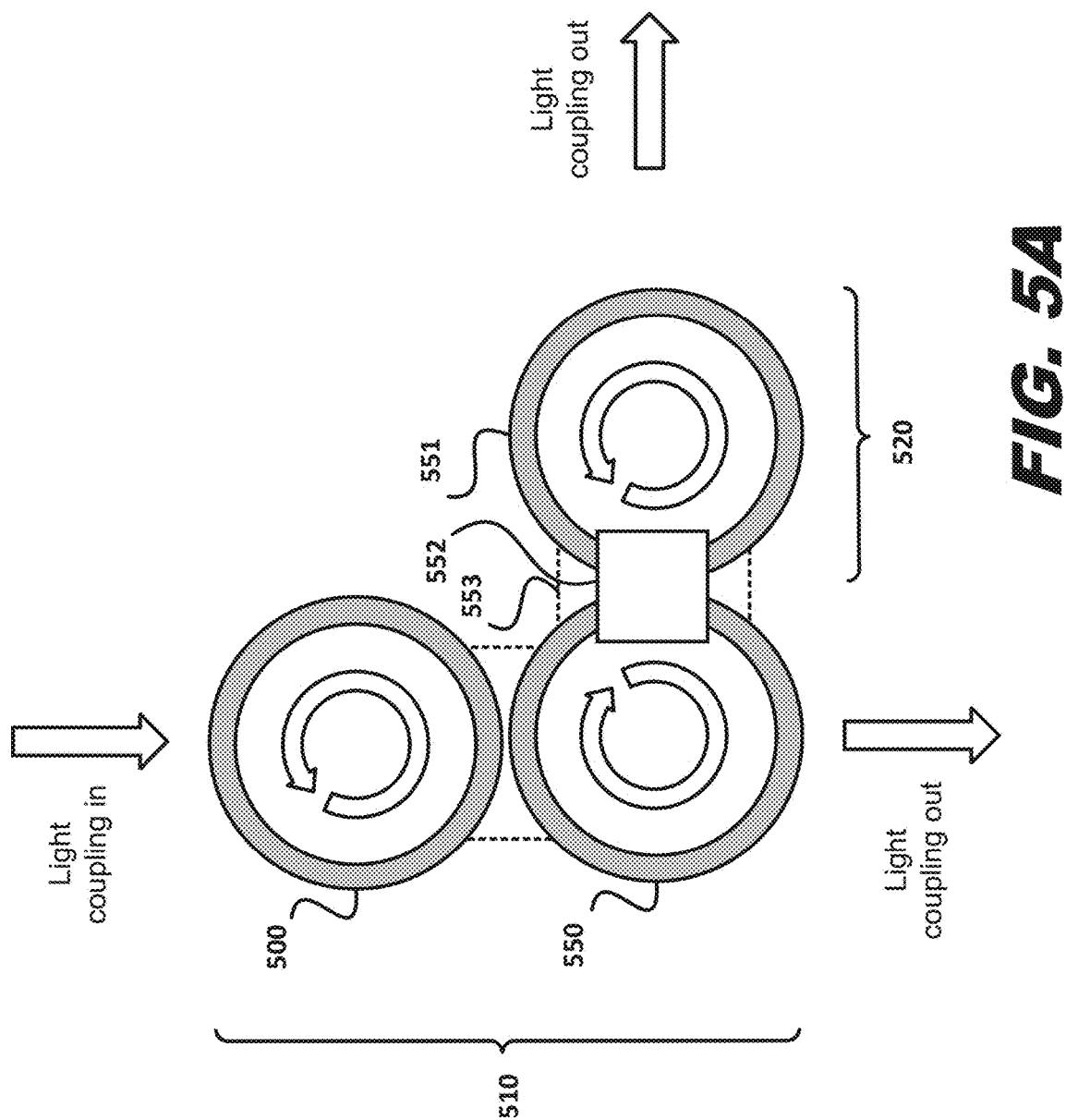
FIGS. 5A and 5B depict schematic block diagrams of example notch filter systems.
Figure 5B:
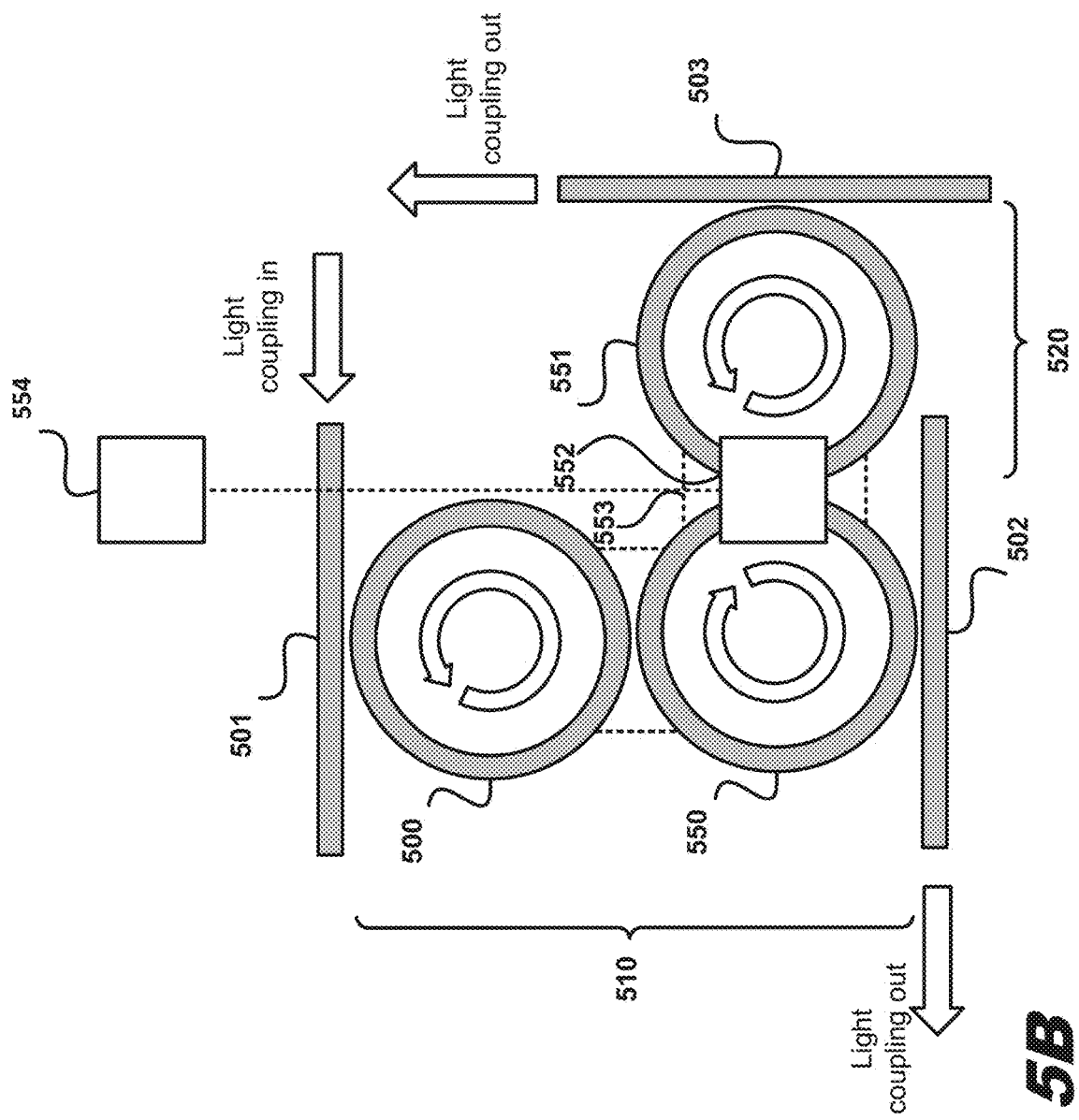

FIGS. 5A and 5B depict schematic block diagrams of example notch filter systems, including a first set 510 of racetrack resonant waveguide structures 500, 550, a second set 520 of at least one racetrack resonant waveguide structure 551, and a primary heating unit 552. In accordance with the present disclosure, the racetrack resonant waveguide structures 500, 550 of the first set 510 and the at least one racetrack resonant waveguide structure 551 of the second set 520 may be integrated circuit-based waveguides.

FIG. 5A depicts a cross-section of the system. Each racetrack resonant waveguide structure of the first set 510 may be positioned sufficiently close to an adjacent racetrack resonant waveguide structure of the first set 510 to enable a first output light signal to couple between each pair of adjacent racetrack resonant waveguide structures in the first set 510 such that the first output light signal may couple through each racetrack resonant waveguide structure of the first set 510. Each racetrack resonant waveguide structure of the second set 520 may be positioned sufficiently close to an adjacent racetrack resonant waveguide structure of the second set 520 to enable a second output light signal to couple between each pair of adjacent racetrack resonant waveguide structures in the second set 520, and at least one racetrack resonant waveguide structure of the second set 520 may be positioned sufficiently close to an adjacent racetrack resonant waveguide structure of the first set 510 to enable the second output light signal to couple from the adjacent racetrack resonant waveguide structure of the first set 510 to a first racetrack resonant waveguide structure of the second set 520, such that the second output light signal may couple through each racetrack resonant waveguide structure of the second set 520 and at least one racetrack resonant waveguide structure of the first set 510. Each of the racetrack resonant waveguide structures may vary in a design element, including, for example, size, shape, composition, directionality, and spacing, relative either to each other in an implementation of the system or to other implementations of the system.

FIG. 5B depicts the system in FIG. 5A further including an input waveguide 501, a first output waveguide 502, and a second output waveguide 503. The input waveguide 501 may be positioned sufficiently close to any portion of a first racetrack resonant waveguide structure 500 of the first set 510 to enable a portion of an input light signal to couple from the input waveguide 501 to the first racetrack resonant waveguide structure 500 of the first set 510 of racetrack resonant waveguide structures 500, 550. The first output waveguide 502 may be positioned sufficiently close to any portion of a last racetrack resonant waveguide structure 550 of the first set 510 to enable the first output light signal to couple from the last racetrack resonant waveguide structure 550 of the first set 510 to the first output waveguide 106. The second output waveguide 503 may be positioned sufficiently close to any portion of a last racetrack resonant waveguide structure 551 of the second set 520 to enable the second output light signal to couple from the last racetrack resonant waveguide structure 551 of the second set 520 to the second output waveguide 503. Each of the input waveguide 501, the first output waveguide 502, and the second output waveguide 503 may vary in a design element, including for example size, shape, composition, directionality, and spacing, relative either to each other in an implementation of the system or to other implementations of the system. In some implementations, the input waveguide 501, the first output waveguide 502, and the second output waveguide 503 may be an integrated circuit-based waveguide. The first output light signal and the second output light signal both originate in the input light signal of the input waveguide 501.

Thus, the input light signal may propagate in the input waveguide 501, and a first portion of the input light signal may couple to the first racetrack resonant waveguide structure 500 of the first set 510, where the portion coupled depends on the resonant wavelength of the first racetrack resonant waveguide structure 500 of the first set 510. The first portion of the input light signal may further couple from the first racetrack resonant waveguide structure 500 of the first set 510 to the last racetrack resonant waveguide structure 550 of the first set 510, by coupling between adjacent racetrack resonant waveguide structures of the first set 510, where each portion coupled depends on the resonant wavelength of each corresponding racetrack resonant waveguide structure and the coupling parameter between the corresponding pair of adjacent racetrack resonant waveguide structures of the first set 510. The first output light signal may then couple from the last racetrack resonant waveguide structure 550 of the first set 510 to the first output waveguide 502. In some implementations, the coupling between pairs of adjacent racetrack resonant waveguide structures may be designed to be different and may depend upon desired characteristics of the shape of the passband filter, such as steepness of the slopes or passband ripple.

A second portion of the input light signal may also be coupled from the first portion of the input light signal in the first set 510, by coupling from the adjacent racetrack resonant waveguide structure 550 of the first set 510 to the first racetrack resonant waveguide structure 551 of the second set 520, where the portion coupled depends on the resonant wavelength of the first racetrack resonant waveguide structure 551 of the second set 520 and the coupling parameter between the adjacent racetrack resonant waveguide structure 550 of the first set 510 and the first racetrack resonant waveguide structure 551 of the second set 520. The second portion of the input light signal may further couple through each of the racetrack resonant waveguide structures of the second set 520 of at least one racetrack resonant waveguide structure 551, by coupling between adjacent racetrack resonant waveguide structures of the second set 520, where each portion coupled depends on the resonant wavelength of each corresponding racetrack resonant waveguide structure and the coupling parameter between the corresponding pair of adjacent racetrack resonant waveguide structures of the second set 520. The second output light signal may then be coupled from the last racetrack resonant waveguide structure 551 of the second set 520 to the second output waveguide 503.

Thus, the second output light signal may couple through each of the second set 520 of at least one racetrack resonant waveguide structure 551 to couple to a second output waveguide 503 by means of coupling between an output set of adjacent racetrack resonant waveguide structures between the input waveguide 501 and the second output waveguide 503 that includes a racetrack resonant waveguide structure of the first set 510. For example, in the system depicted in FIG. 5B, the output set for the second output light signal includes racetrack resonant waveguide structures 500, 550, 551, where racetrack resonant waveguide structures 500, 550 are in the first set 510 and racetrack resonant waveguide structure 551 is in the second set 520. In FIG. 5B, the second set 520 comprises one racetrack resonant waveguide structure 551, such that the first racetrack resonant waveguide structure 551 and the last racetrack resonant waveguide structure 551 of the second set 520 are the same. In other implementations of the system, the second set 520 may comprise multiple racetrack resonant waveguide structures, so a first racetrack resonant waveguide structure and a last racetrack resonant waveguide structure may be distinct.

For tuning of the notch filter system, the primary heating unit 552 may use heating to change a central frequency of at least one of the first output light signal and the second output light signal and a signal transfer function for the system, thereby selecting the wavelengths comprising the first output light signal coupled to the first output waveguide 501 and the second output light signal coupled to the second output waveguide 502.

The primary heating unit 552 may use a primary controller 554 to heat a corresponding primary region 553 that includes portions of a corresponding pair of adjacent racetrack resonant waveguide structures 550, 551 selected from at least one of the first set 510 and the second set 520. The primary region 553 may vary relative to the primary heating unit 552, including for example in size, shape, or continuity, based on a scope of heating by the primary heating unit 552. The primary region 553 may be illustrative of the scope of heating via the primary heating unit 552, rather than limiting. The primary heating unit 552 may vary in a design element, including for example size, shape, composition, spacing, and positioning, relative to other implementations of the system.

The primary controller 554 may be positioned at a different location from the primary heating unit 552 or the primary region 553. The primary controller 554 may implement a temperature control algorithm to control the primary heating unit 552.

Figure 6:
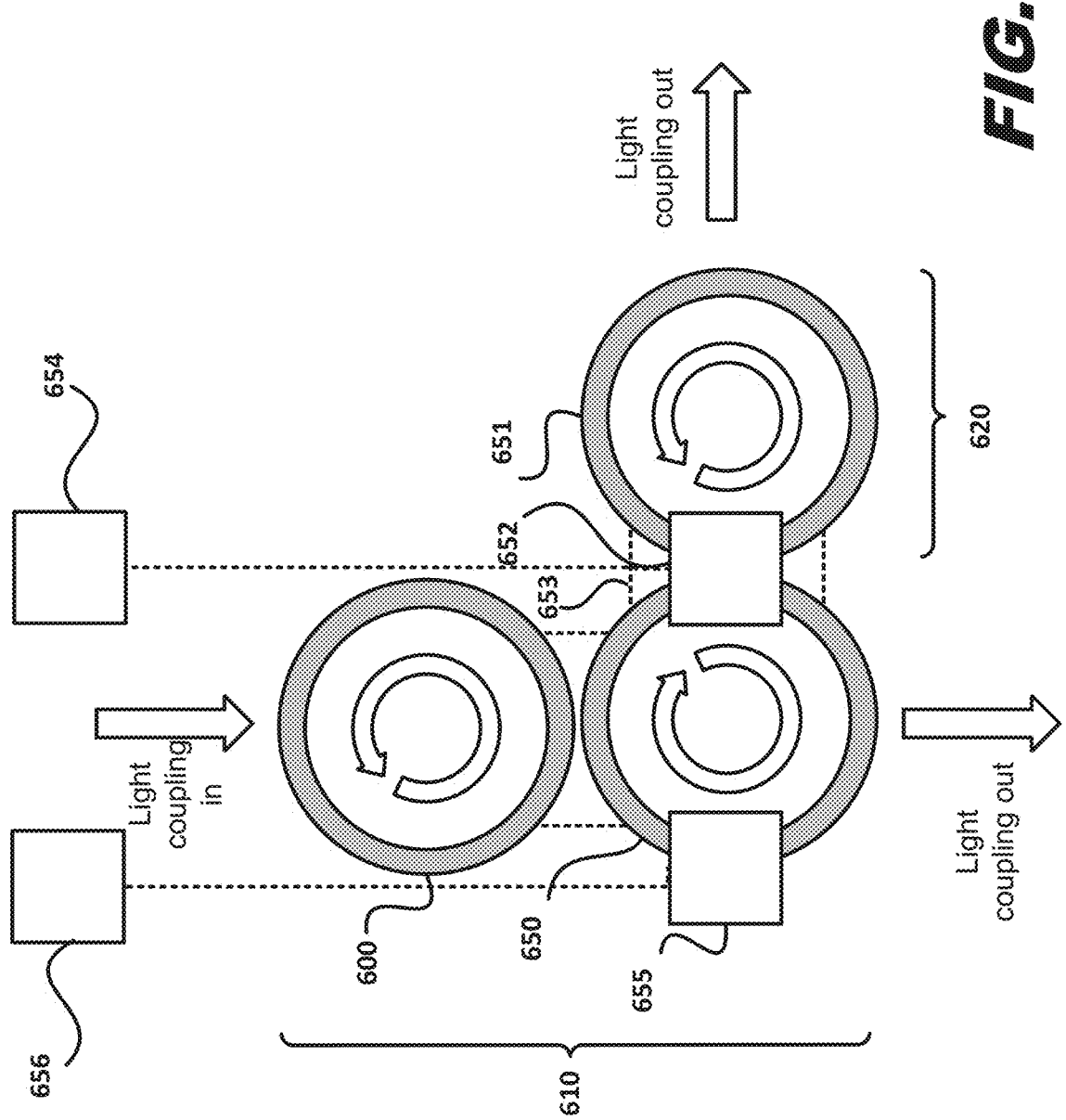
FIG. 6 depicts a schematic block diagram of an example notch filter system that includes a secondary heating unit.

FIG. 6 depicts a schematic block diagram of an example notch filter system that includes a secondary heating unit 655. The secondary heating unit 655 may use a secondary controller 656 to heat a secondary region, distinct from the primary region 653 and including a second portion of one of the racetrack resonant waveguide structures in one of the first set 610 or the second set 620 of racetrack resonant waveguide structures. For example, in FIG. 6 the secondary heating unit 655 is positioned to heat a secondary region including a second portion of racetrack resonant waveguide structure 650. The secondary heating unit 655 may vary in a design element, including for example size, shape, composition, spacing, and positioning, relative either to the primary heating unit 652 or to other implementations of the system.

The secondary controller 656 may be independent of the primary controller 654. The secondary controller 656 may be positioned at a different location from the secondary heating unit 655 or the secondary region. The secondary controller 656 may implement a temperature control algorithm to control the primary heating unit 655, where the temperature control algorithm implemented by the secondary controller 656 may be different from the algorithm implemented by the primary controller 654. The secondary controller 656 may vary in a design element, including, for example, size, shape, composition, and connection to the secondary heating unit 655, relative either to the primary controller 654 in an implementation of the system or to other implementations of the system.

Figure 7A:
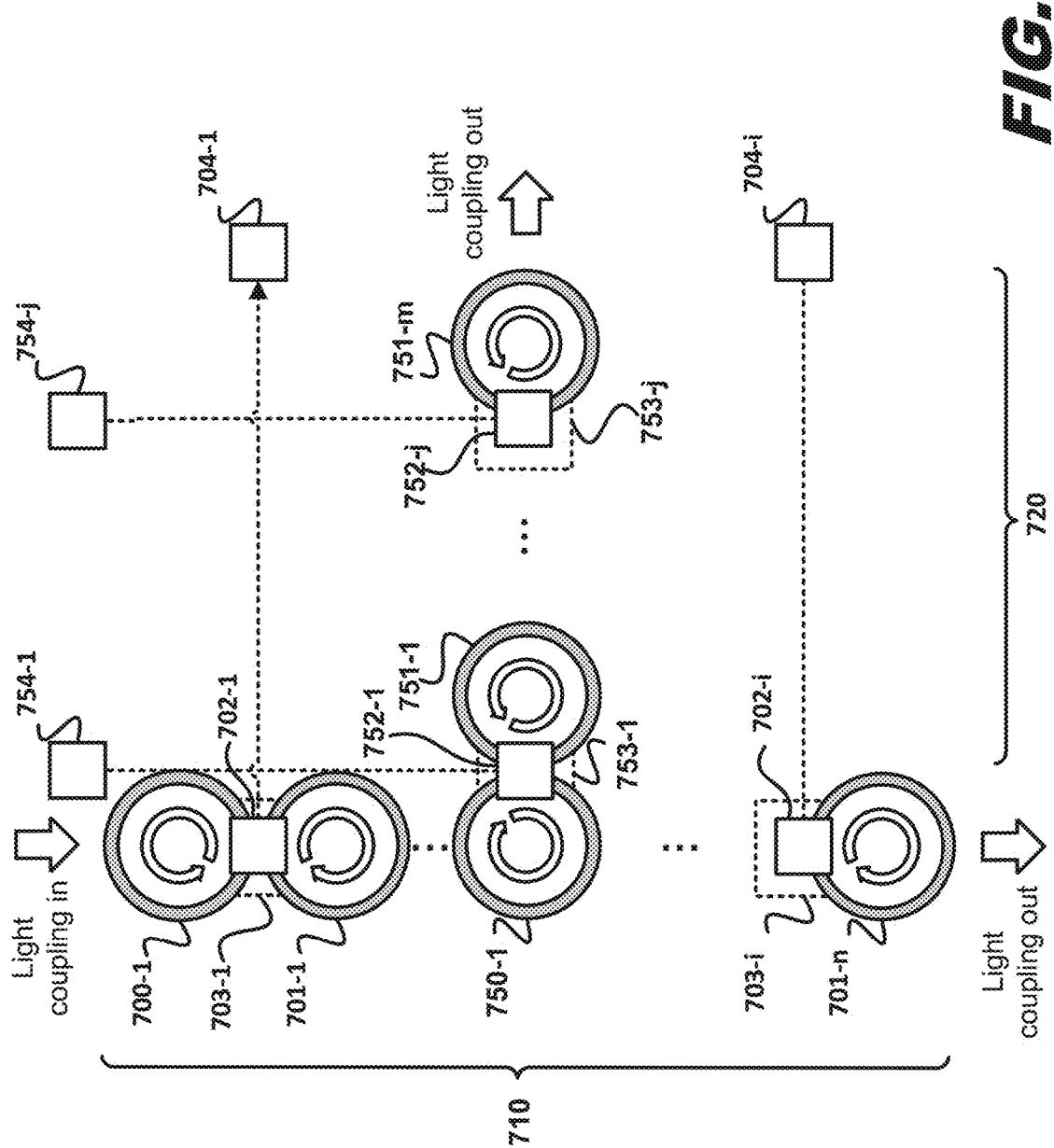
FIGS. 7A and 7B depict schematic block diagrams of example notch filter systems that include an additional primary heating unit.
Figure 7B:
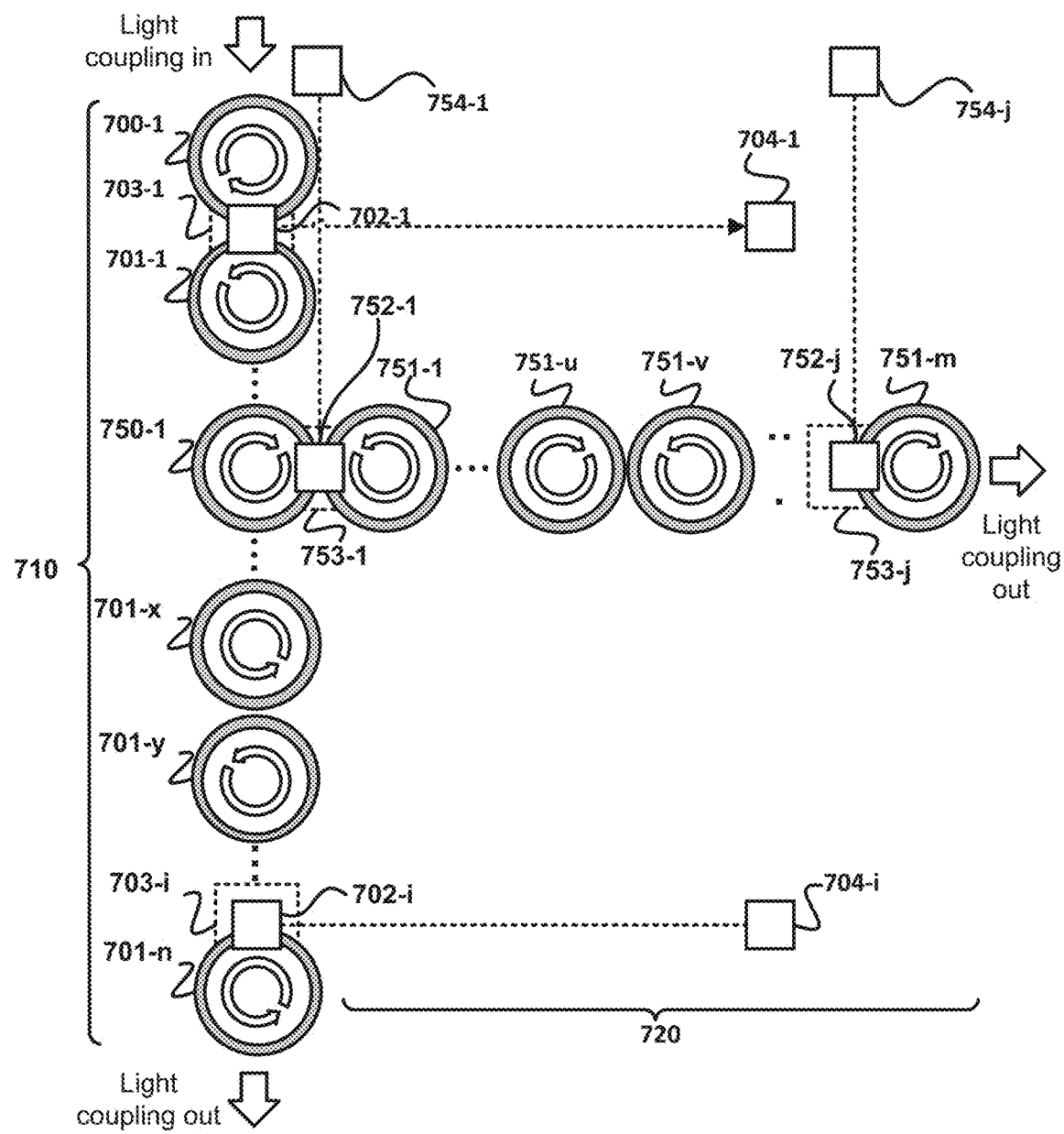

FIGS. 7A and 7B depict schematic block diagrams of example notch filter systems that include an additional primary heating unit. Each additional primary heating unit may be positioned to heat a corresponding primary region including portions of a corresponding pair of adjacent racetrack resonant waveguide structures. In general, the system may comprise a number n of racetrack resonant waveguide structures in the first set 710, a number m of racetrack resonant waveguide structures in the second set 720, a number i of primary heating units in the first set 710, and a number j of primary heating units in the second set 720, where each of the numbers n, m, i, and j may be independent of each other number.

FIG. 7A depicts the system in an example case in which a first primary heating unit 702-1 in the first set 710 is positioned to heat a corresponding primary region 703-1. The primary region 703-1 includes portions of a corresponding pair of adjacent racetrack resonant waveguide structures 700-1, 701-1 that includes a first racetrack resonance structure 700-1 and a second racetrack resonance structure 701-1 in the first set 710. A first primary heating unit 752-1 in the second set 720 is positioned to heat a corresponding primary region 753-1. The primary region 753-1 includes portions of a corresponding pair of adjacent racetrack resonant waveguide structures 750-1, 751-1 that includes a first racetrack resonant waveguide structure 751-1 in the second set 720 and an adjacent racetrack resonant waveguide structure 750-1 in the first set 710. A last primary heating unit 702-$i$ in the first set 710 is positioned to heat a corresponding primary region 703-$l$. The primary region 703-$l$ includes portions of a corresponding pair of adjacent racetrack resonant waveguide structures that includes a last racetrack resonant waveguide structure 701-$n$ in the first set 710 and a second-to-last racetrack resonant waveguide structure (not shown in FIG. 7A). A last primary heating unit 752-$j$ in the second set 720 is positioned to heat a corresponding primary region 753-$j$. The primary region 753-$j$ includes portions of a corresponding pair of adjacent racetrack resonant waveguide structures that includes a last racetrack resonant waveguide structure 751-$m$ in the second set 720 and a second-to-last racetrack resonant waveguide structure (not shown in FIG. 7A).

Yet, for example, if the system were to comprise a number n=4 of racetrack resonant waveguide structures in the first set 710 and a number m=2 of racetrack resonant waveguide structures in the second set 720, then the second-to-last racetrack resonant waveguide structure of the first set 710 may correspond to racetrack resonant waveguide structure 750-1, and the second-to-last racetrack resonant waveguide structure of the second set 720 may correspond to racetrack resonant waveguide structure 751-1. Then the system may comprise a number i=2 of primary heating units in the first set 710 and a number j=2 of primary heating units in the second set 720. Such a system may depict the example notch filter system of FIG. 5A for an example case of three additional primary heating units, two in the first set 710 and one in the second set 720 of racetrack resonant waveguide structures, such that the last primary heating unit 702-$i$ of the first set 710 may be labelled 702-2 (for number 2) and the last primary heating unit 752-$j$ of the second set 720 may be labelled 752-2 (for number 2).

However, each pair of adjacent racetrack resonant waveguide structures in the system need not have a corresponding primary heating unit. FIG. 7B depicts the system of FIG. 7A in an example case that includes a pair of coupled adjacent racetrack resonant waveguide structures 701-$x$, 701-$y$ in the first set 710 that does not have a primary heating unit and further includes a pair of coupled adjacent racetrack resonant waveguide structures 751-$u$, 751-$v$ in the second set 720 that does not have a corresponding primary heating unit. For example, to continue from the example immediately above (n=4, m=2, i=2, j=2), racetrack resonant waveguide structure 701-$x$ may correspond to racetrack resonant waveguide structure 701-1 and racetrack resonant waveguide structure 701-$y$ may correspond to racetrack resonant waveguide structure 750-1, as in the example above they would form a pair of adjacent coupled racetrack resonant waveguide structures that does not have a corresponding primary heating unit; however, a pair of adjacent racetrack resonant waveguide structures 751-$u$, 751-$v$ may not exist for a case of m=2, j=2, as each pair of racetrack resonant waveguide structures in the second set 720 would have a corresponding primary heating unit. In general, the system of FIG. 7B may comprise a number i≤n−1 of primary heating units in the first set 710, and a number j≤m−1 primary heating units in the second set 720, such that each of the first set 710 and the second set 720 of racetrack resonant waveguide structures have at least one pair of adjacent racetrack resonant waveguide structures that does not have a corresponding primary heating unit positioned to heat a corresponding primary region.

The systems depicted in FIG. 7A and FIG. 7B may further vary in the number i of primary heating units in the first set 710, the number j of primary heating units in the second set 720, or in a design element, including, for example, size, shape, composition, spacing, and positioning of a primary heating unit, relative to other implementations of the system. Each primary region may vary relative to a corresponding primary heating unit, including, for example, in size, shape, or continuity, based on a scope of heating by the corresponding primary heating unit.

Each primary heating unit may use a corresponding primary controller to heat a corresponding primary region simultaneously, including portions of a corresponding pair of adjacent racetrack resonant waveguide structures. For example, in the systems depicted in FIG. 7A and FIG. 7B, a first primary heating unit 702-1 in the first set 710 uses a corresponding primary controller 704-1, whereas a last primary heating unit 702-i in the first set 710 uses a corresponding primary controller 704-i; further, a first primary heating unit 752-1 in the second set 720 uses a corresponding primary controller 754-1, whereas a last primary heating unit 754-j in the second set 720 uses a corresponding primary controller 754-j. Each primary controller may be independent of each other primary controller. Each primary controller may vary in a design element, including, for example, size, shape, composition, and connection to the corresponding primary heating unit, relative either to other primary controllers in an implementation of the system or to other implementations of the system. Each primary heating unit may use heating to change the central frequency of at least one of the first output light signal and the second output light signal and the signal transfer function for the notch filter system.

While heating units are discussed in the examples above, the techniques as described in the present disclosure may also comprise cooling units. Changing the temperature, whether an increase or a decrease, of a portion of the racetrack resonant waveguide structure may result in changing the refractive index. The resonant wavelength of the racetrack resonant waveguide structure may be tuned by changing the effective refractive index of the racetrack resonant waveguide structure. Thus, cooling units may be used instead of, or in addition to, heating units to tune the notch filter system.

Figure 8:
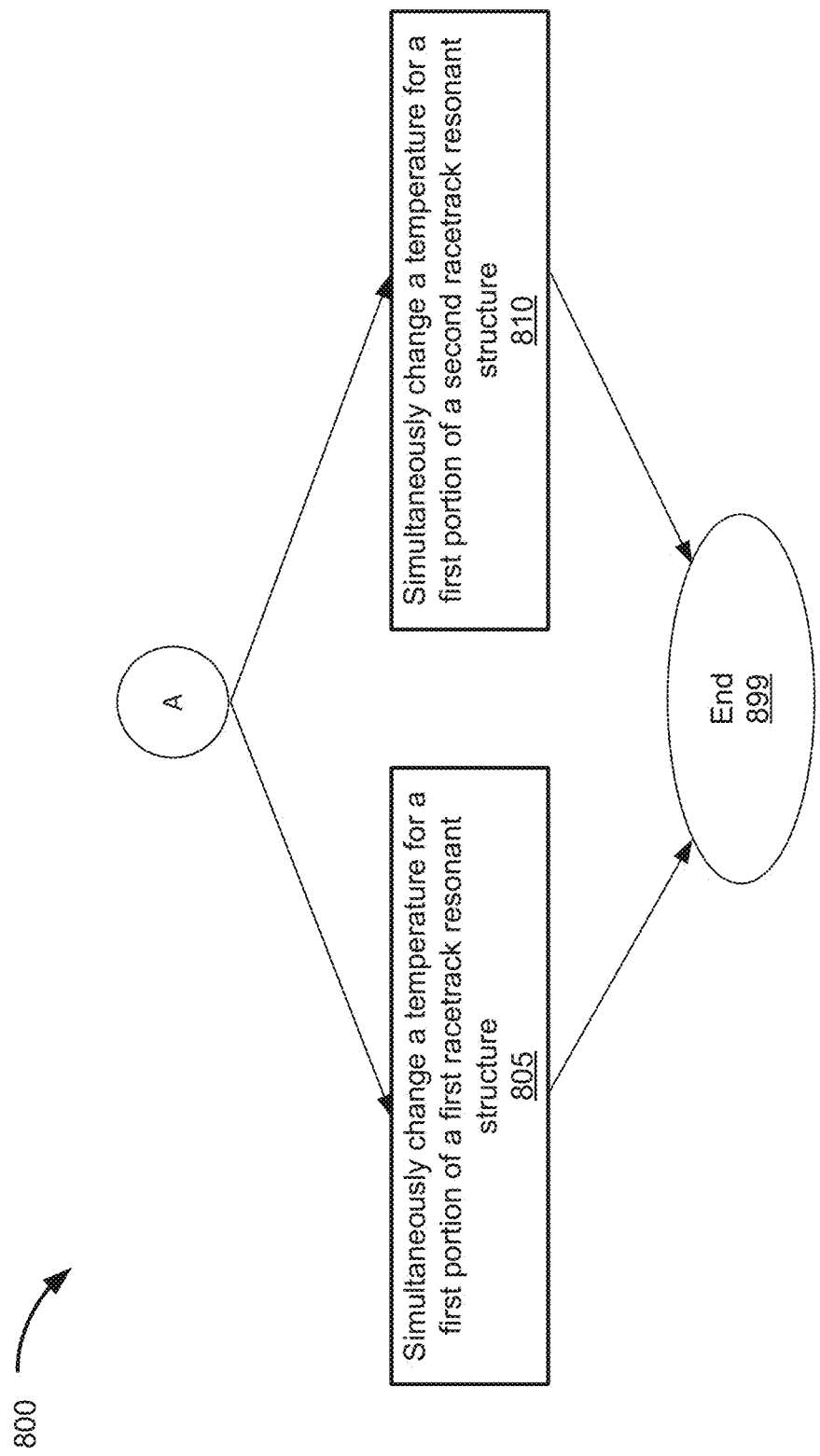
FIG. 8 depicts a flow diagram illustrating an example process of changing a central frequency and a passband width of an optical notch filter.

FIG. 8 depicts a flow diagram illustrating an example process of changing a central frequency and a passband width of an optical notch filter, where the filter includes a first racetrack resonant waveguide structure coupled to a second racetrack resonant waveguide structure. The process 800 starts at point A. Simultaneously, at block 805, a temperature for a first portion of a first racetrack resonant waveguide structure may be changed; and at block 810, a temperature for a first portion of a second racetrack resonant waveguide structure may be changed. The temperatures of the first portion of the first racetrack resonant waveguide structure and the first portion of the second racetrack resonant waveguide structure may be changed simultaneously by using a heating or a cooling unit to heat or cool both first portions simultaneously. As a result, a coupling parameter between the first racetrack resonant waveguide structure and the second racetrack resonant waveguide structure may be tuned and simultaneously a resonance of the first racetrack resonant waveguide structure and a resonance of the second racetrack resonance structure may be tuned, resulting in tuning of a central frequency and a passband width of the optical notch filter. A primary controller may control the changing of the temperatures. The process ends at block 899.

Figure 9:
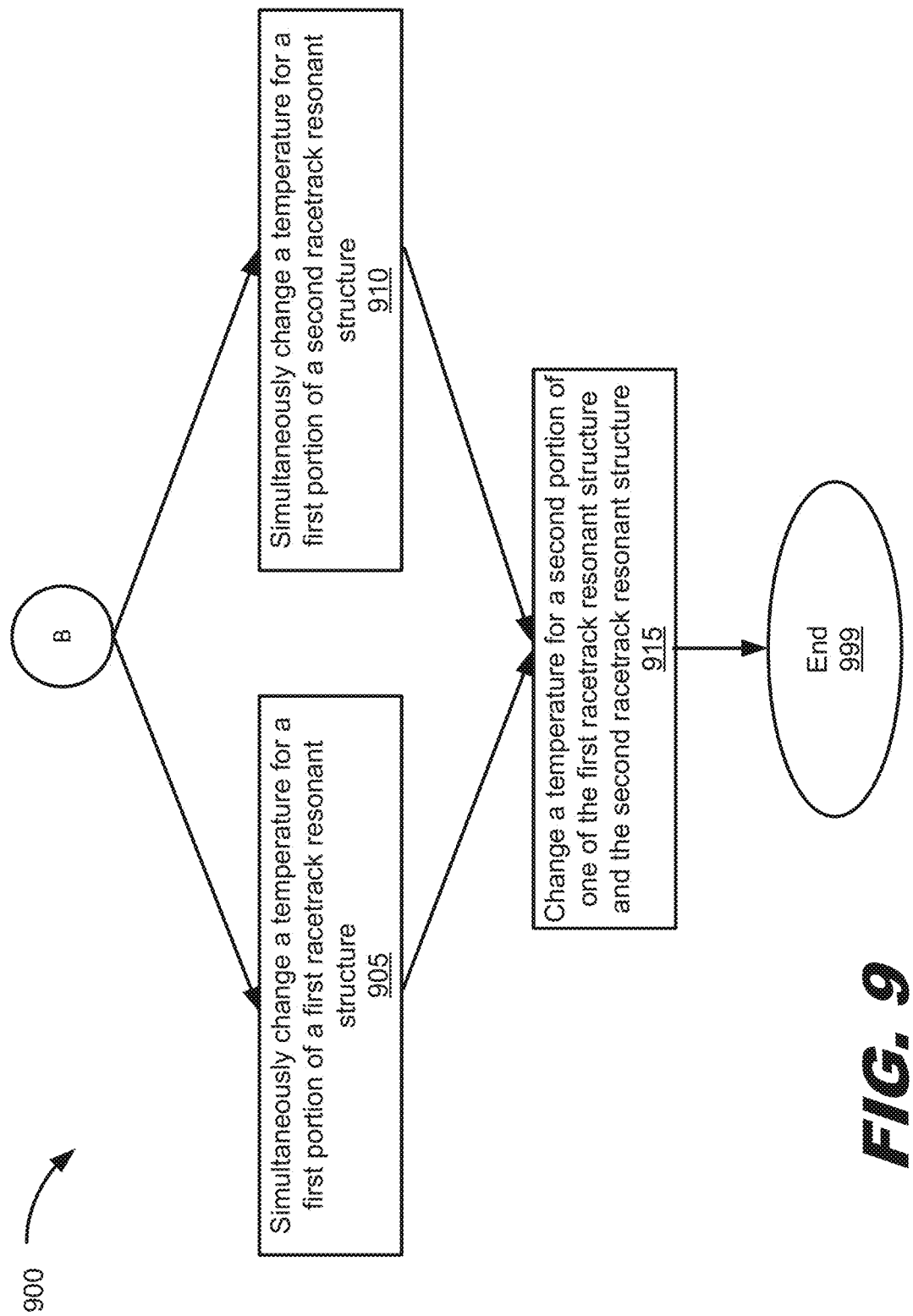
FIG. 9 depicts a flow diagram illustrating another example process of changing a central frequency and a passband width of an optical notch filter.

FIG. 9 depicts a flow diagram illustrating another example process of changing a central frequency and a passband width of an optical notch filter. As in FIG. 8, at block 905, a temperature for a first portion of a first racetrack resonant waveguide structure may be changed, while simultaneously at block 910, a temperature for a first portion of a second racetrack resonant waveguide structure is changed. After changing the temperature simultaneously at blocks 905 and 910, at block 915, a temperature for a second portion of one of the first racetrack resonant waveguide structure and the second racetrack resonant waveguide structure may be changed. Block 915 allows for further tuning of the optical notch filter system, for example, by changing a central frequency, based on changing a resonance of one of the first racetrack resonant waveguide structure and the second racetrack resonant waveguide structure. The temperature changes in block 905 and 910 may be heating performed by a heating unit or cooling performed by a cooling unit. Similarly, the temperature change in block 915 may be heating performed by a heating unit or cooling performed by a cooling unit. A secondary controller may control each changing of the temperature for the second portion. The method ends at block 999.

As used in the specification and claims herein, the singular forms "a," "an," and "the" include plural referents unless the context clearly dictates otherwise.

What is claimed is:

1. An optical notch filter system comprising:
   a first racetrack resonant waveguide structure, positioned to enable an input light signal to couple from a first waveguide;
   a second racetrack resonant waveguide structure, positioned to enable the input light signal to couple between the first racetrack resonant waveguide structure and the second racetrack resonant waveguide structure, and further positioned to enable a first output light signal to couple from the second racetrack resonant waveguide structure to a second waveguide;
   a first primary heating unit, positioned to heat a first primary region including a first portion of the first racetrack resonant waveguide structure and a first portion of the second racetrack resonant waveguide structure, to change a central frequency and a passband width for the system to select a wavelength comprising the first output light signal;
   a third racetrack resonant waveguide structure, positioned to enable the input light signal to couple between the second racetrack resonant waveguide structure and the third racetrack resonant waveguide structure, and further positioned to enable a second output light signal to couple from the third racetrack resonant waveguide structure to a third waveguide; and
   a second primary heating unit, positioned to heat a second primary region including a first portion of the third racetrack resonant waveguide structure and a second portion of the second racetrack resonant waveguide structure, to change a central frequency and a passband width for the system to select a wavelength comprising the second output light signal, and
   wherein the first primary heating unit is controlled by a first primary controller and the second primary heating unit is controlled by a second primary controller.

2. The system of claim 1, further comprising:
   a secondary heating unit, positioned to heat a secondary region including a non-primary portion of one of the first racetrack resonant waveguide structure and the second racetrack resonant waveguide structure, the non-primary portion excluding the first portion of the first racetrack resonant waveguide structure, the first portion of the second racetrack resonant waveguide structure, and the second portion of the second racetrack resonant waveguide structure;
   wherein the first primary heating unit uses the first primary controller to heat the first portion of the first racetrack resonant waveguide structure and the first portion of the second racetrack resonant waveguide structure simultaneously, and further wherein the secondary heating unit uses a secondary controller to heat the non-primary portion.

3. The system of claim 1, further comprising:

an additional racetrack resonant waveguide structure, positioned to enable the first output light signal to couple between adjacent racetrack resonant waveguide structures comprising the second racetrack resonant waveguide structure and the additional racetrack resonant waveguide structure, the additional racetrack resonant waveguide structure being different from the third racetrack resonant waveguide structure; and an additional primary heating unit, positioned to heat an additional primary region including portions of the adjacent racetrack resonant waveguide structures comprising the second racetrack resonant waveguide structure and the additional racetrack resonant waveguide structure, wherein the first output light signal couples through the second racetrack resonant waveguide structure and the additional resonant racetrack resonant waveguide structure, and wherein the additional primary heating unit uses a corresponding primary controller to heat portions of the adjacent racetrack resonant waveguide structures comprising the second racetrack resonant waveguide structure and the additional racetrack resonant waveguide structure simultaneously, to change the central frequency and the passband width for the system, and wherein the corresponding primary controller operates independently from the first primary controller of the first primary heating unit.

4. The system of claim 3, wherein further a device selected from one of the groups of racetrack resonant waveguide structures, primary heating units, and secondary heating units incorporates a design element different from other devices in the selected group.

5. The system of claim 1, wherein further the first primary heating unit is positioned symmetrically with respect to the first racetrack resonant waveguide structure and the second racetrack resonant waveguide structure.

6. An optical notch filter system comprising:

a first set of racetrack resonant waveguide structures, positioned to enable a first output light signal that originates from an input waveguide and couples through each of the first set of racetrack resonant waveguide structures to couple to a first output waveguide by means of coupling between adjacent racetrack resonant waveguide structures;

a second set of at least one racetrack resonant waveguide structure, positioned to enable a second output light signal that originates from the input waveguide and couples through each of the second set of at least one racetrack resonant waveguide structure to couple to a second output waveguide by means of coupling between an output set of adjacent racetrack resonant waveguide structures between the input waveguide and the second output waveguide that includes a racetrack resonant waveguide structure of the first set; and a primary heating unit, positioned to heat a primary region including portions of adjacent racetrack resonant waveguide structures, wherein the primary heating unit uses a primary controller to heat the portions of adjacent racetrack resonant waveguide structures simultaneously, to change a central frequency of at least one of the first output light signal and the second output light signal and a signal transfer function for the system.

7. The system of claim 6, further comprising:

a secondary heating unit, positioned to heat a secondary region including a second portion of one of the racetrack resonant waveguide structures in one of the first set of racetrack resonant waveguide structures and the second set of racetrack resonant waveguide structures, wherein the secondary heating unit uses a secondary controller to heat the second portion.

8. The system of claim 6, further comprising:

an additional primary heating unit, positioned to heat an additional primary region including portions of adjacent racetrack resonant waveguide structures, wherein each primary heating unit uses a corresponding primary controller to heat portions of adjacent racetrack resonant waveguide structures simultaneously, to change the central frequency of at least one of the first output light signal and the second output light signal and the signal transfer function for the system.

9. The system of claim 8, wherein further a device selected from one of the groups of racetrack resonant waveguide structures, primary heating units, and secondary heating units incorporates a design element different from other devices in the selected group.

10. The system of claim 6, wherein further the first output light signal and the second output light signal both couple to a central racetrack resonant waveguide structure that is part of the output set of adjacent racetrack resonant waveguide structures, and wherein further the central racetrack resonant waveguide structure incorporates a design element different from other racetrack resonant waveguide structures of either the first set of racetrack resonant waveguide structures or the second set of at least one racetrack resonant waveguide structure.

11. A method for tuning an optical notch filter, the method comprising:

changing a temperature for a first portion of a first racetrack resonant waveguide structure by a first heating unit;

changing simultaneously a temperature for a first portion of a second racetrack resonant waveguide structure by the first heating unit, to change a central frequency and a passband width for a notch filter including the first racetrack resonant waveguide structure and the second racetrack resonant waveguide structure, wherein the first racetrack resonant waveguide structure and the second racetrack resonant waveguide structure are waveguides positioned to enable a first light signal to couple between the first racetrack resonant waveguide structure and the second racetrack resonant waveguide structure, and the second racetrack resonant waveguide structure is further positioned to enable the first light signal to couple between the second racetrack resonant waveguide structure and a first output waveguide; and changing a temperature of a first portion of a third racetrack resonant waveguide structure and a second portion of the second racetrack resonant waveguide structure;

wherein the third racetrack resonant waveguide structure is positioned to enable a second light signal to couple between the third racetrack resonant waveguide structure and the second racetrack resonant waveguide structure, and the third racetrack resonant waveguide structure is further positioned to enable the second light signal to couple between the third racetrack resonant waveguide structure and a second output waveguide.

12. The method of claim 11, further comprising:
changing a temperature for a non-primary portion of one of the first racetrack resonant waveguide structure and the second racetrack resonant waveguide structure by the first heating unit, to change the central frequency for the notch filter, the non-primary portion excluding the first portion of the first racetrack resonant waveguide structure, the first portion of the second racetrack resonant waveguide structure, and the second portion of the second racetrack resonant waveguide structure.

13. The method of claim 11, wherein a primary controller controls changing a temperature.

14. The method of claim 11, wherein changing a temperature comprises heating and wherein further the heating is performed by either the first heating unit or the second heating unit.

15. The system of claim 1, the first primary controller being positioned at a different location from the first primary heating unit, the first primary region, or both.

16. The system of claim 1, wherein:
the first racetrack resonant waveguide structure and the second racetrack resonant waveguide structure are part of a first set of racetrack resonant waveguide structures, the first set of racetrack resonant waveguide structures further including one or more additional first set racetrack resonant waveguide structures disposed between the second racetrack resonant waveguide structure and the second waveguide, and
the third racetrack resonant waveguide structure is part of a second set of racetrack resonant waveguide structures, the second set of racetrack resonant waveguide structures further including one or more additional second set racetrack resonant waveguide structures disposed between the third racetrack resonant waveguide structure and the third waveguide.

17. The system of claim 6, wherein each pair of adjacent racetrack resonant waveguide structures of the output set of adjacent racetrack resonant waveguide structures between the input waveguide and the second output waveguide comprises:
a respective primary heating unit associated with a primary region of the pair of adjacent racetrack resonant waveguide structures; and
a respective primary controller configured to control a temperature of the respective primary heating unit,
wherein each respective primary controller controls the temperature of the respective primary heating unit independently of each other respective primary controller.

18. The system of claim 6, further comprising:
the first set of racetrack resonant waveguide structures comprises a first number of waveguide structures and a first number of primary heating units and the second set of racetrack resonant waveguide structures comprises a second number of waveguide structures and a second number of primary heating units,
wherein the first number of waveguide structures is determined independently of the second number of waveguide structures, and the first number of primary heating units is determined independently of the second number of primary heating units.

* * * * *